(12) United States Patent
Park et al.

(10) Patent No.: US 11,402,872 B2
(45) Date of Patent: Aug. 2, 2022

(54) ELECTRONIC DEVICE WITH BONDING STRUCTURE

(71) Applicant: Samsung Electronics Co., Ltd., Suwon-si (KR)

(72) Inventors: Daehyeong Park, Suwon-si (KR); Jongmin Choi, Suwon-si (KR); Jaehee Kim, Suwon-si (KR); Jongkeun Kim, Suwon-si (KR); Hun Kim, Suwon-si (KR); Donghyun Byun, Suwon-si (KR); Uyhyeon Jeong, Suwon-si (KR); Iksu Jung, Suwon-si (KR); Sunggun Cho, Suwon-si (KR); Chongkun Cho, Suwon-si (KR); Wonhee Choi, Suwon-si (KR); Seunghyun Hwang, Suwon-si (KR); Byounguk Yoon, Suwon-si (KR); Minsung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 17/112,121

(22) Filed: Dec. 4, 2020

(65) Prior Publication Data

US 2021/0089085 A1 Mar. 25, 2021

Related U.S. Application Data

(63) Continuation of application No. 16/706,006, filed on Dec. 6, 2019, now Pat. No. 10,860,061.

(30) Foreign Application Priority Data

Dec. 6, 2018 (KR) .......................... 10-2018-0155724

(51) Int. Cl.
*G06F 1/16* (2006.01)
*H05K 5/00* (2006.01)
*H05K 7/00* (2006.01)

(52) U.S. Cl.
CPC .......... *G06F 1/1637* (2013.01); *G06F 1/1626* (2013.01); *G06F 1/1656* (2013.01)

(58) Field of Classification Search
CPC .... G06F 1/1637; G06F 1/1626; G06F 1/1656; G06F 1/1633; G06F 1/1658
See application file for complete search history.

(56) References Cited

U.S. PATENT DOCUMENTS

| 6,028,772 A | 2/2000 | Suhir |
|---|---|---|
| 9,639,148 B2 | 5/2017 | Kato et al. |

(Continued)

FOREIGN PATENT DOCUMENTS

| CN | 108093571 A | 5/2018 |
|---|---|---|
| CN | 108153023 A | 6/2018 |

(Continued)

OTHER PUBLICATIONS

European Search Report dated Dec. 3, 2021; European Appln. No. 19892914.3-1216 / 3874347 PCT/KR20190172016.

(Continued)

*Primary Examiner* — Anthony M Haughton
(74) *Attorney, Agent, or Firm* — Jefferson IP Law, LLP

(57) ABSTRACT

An electronic device is provided that includes a housing including a front plate facing a first direction, a rear plate facing a second direction opposite to the first direction, and a lateral member surrounding a space between the front plate and the rear plate and at least partially constructed of a metal material, wherein the front plate includes a first edge having a first length and extending in a third direction, a second edge having a second length longer than the first length and (Continued)

extending in a fourth direction orthogonal to the third direction, a third edge parallel to the first edge, having the first length, and extending in the third direction from the second edge, a fourth edge parallel to the second edge, having the second length, and extending in the fourth direction from the first edge, a first region in which the third edge and the fourth edge meet, and a second region in which the second edge and the third edge meet, a display viewable through the front plate, and an adhesive layer constructed in a closed-curve shape along the first edge, second edge, third edge, and fourth edge of the front plate, wherein, when viewed from above the display, a width of the adhesive layer in the first region and the second region is greater than a width of the adhesive layer outside the first region and the second region.

20 Claims, 19 Drawing Sheets

(56) References Cited

U.S. PATENT DOCUMENTS

| | | | |
|---|---|---|---|
| 9,680,206 B2 | 6/2017 | Youn et al. | |
| 2006/0171107 A1 | 8/2006 | Yamamoto et al. | |
| 2008/0068529 A1* | 3/2008 | Tebbit | G02F 1/133308 445/24 |
| 2012/0050975 A1* | 3/2012 | Garelli | G06F 1/181 361/679.01 |
| 2013/0170115 A1* | 7/2013 | Jung | G02F 1/00 361/679.01 |
| 2013/0265505 A1* | 10/2013 | Hirofumi | H04N 5/64 361/679.01 |
| 2015/0212350 A1* | 7/2015 | Niiyama | B32B 27/36 349/122 |
| 2016/0344089 A1* | 11/2016 | Baik | G06F 1/163 |
| 2017/0063421 A1 | 3/2017 | Moon et al. | |
| 2017/0099742 A1 | 4/2017 | Choi et al. | |
| 2018/0033571 A1 | 2/2018 | Choi et al. | |
| 2018/0155576 A1 | 6/2018 | Ahn et al. | |
| 2018/0175130 A1 | 6/2018 | Kang et al. | |
| 2018/0219165 A1 | 8/2018 | Kwon et al. | |
| 2018/0270976 A1* | 9/2018 | Pakula | A45F 5/00 |
| 2018/0310426 A1 | 10/2018 | Cho et al. | |
| 2018/0341290 A1* | 11/2018 | Sim | G06F 3/042 |
| 2018/0343332 A1 | 11/2018 | Kim et al. | |
| 2018/0368274 A1* | 12/2018 | Ha | H04M 1/0249 |
| 2019/0018275 A1* | 1/2019 | Ochi | H04M 1/0266 |
| 2019/0041909 A1* | 2/2019 | Pakula | H04N 5/2258 |
| 2019/0182573 A1* | 6/2019 | Shin | G06F 1/1605 |
| 2020/0089287 A1* | 3/2020 | Oster | G06F 1/1637 |

FOREIGN PATENT DOCUMENTS

| | | |
|---|---|---|
| CN | 108282559 A | 7/2018 |
| JP | 2017-102276 A | 6/2017 |
| KR | 10-2017-0110479 A | 10/2017 |
| KR | 20180019430 A | 2/2018 |

OTHER PUBLICATIONS

International Search Report dated Apr. 2, 2020, issued in International Application No. PCT/KR2019/017216.

Written Opinion dated Apr. 2, 2020, issued in International Application No. PCT/KR2019/017216.

European Search Report dated Mar. 14, 2022; European Appln. No. 19892914.3-1216 / 3874347 PCT/KR20190172016.

* cited by examiner

ELECTRONIC DEVICE WITH BONDING STRUCTURE

CROSS-REFERENCE TO RELATED APPLICATION(S)

This application is a continuation application of prior application Ser. No. 16/706,006, filed on Dec. 6, 2019, which has issued as U.S. Pat. No. 10,860,061 on Dec. 8, 2020, which is based on and claims priority under 35 U.S.C. § 119(a) of a Korean patent application number 10-2018-0155724, filed on Dec. 6, 2018, in the Korean Intellectual Property Office, the disclosure of which is incorporated by reference herein in its entirety.

BACKGROUND

1. Field

The disclosure relates to a bonding structure of an electronic device.

2. Description of Related Art

A portable electronic device may have a display disposed to a front face. The display may have a window and a display panel, and may be placed in such a manner that the window is attached to a mounting portion of a housing of the electronic device. The electronic device uses a tape or an adhesive material between the window and the mounting portion to seal between the window and the mounting portion, thereby achieving a waterproof structure of the electronic device.

Meanwhile, in order to secure a view region of the display disposed to the front face of the electronic device, when a corner portion of the housing is designed to have a smooth structure or when the display panel is mounted close to the corner portion of the housing, a mounting region for an adhesive material of a bonding structure may be reduced.

In the electronic device having the bonding structure, a tape or an adhesive liquid shall not be detached from the mounting portion, and a crack or the like shall be avoided to prevent a foreign material from entering into the electronic device through the crack.

The above information is presented as background information only to assist with an understanding of the disclosure. No determination has been made, and no assertion is made, as to whether any of the above might be applicable as prior art with regard to the disclosure.

SUMMARY

However, part of the housing may be impacted when the electronic device falls. Due to the impact on the part of the housing, the electronic device having the bonding structure may be in a poor waterproof and/or dustproof condition. For example, when the impact is concentrated on part of the housing, the tape or adhesive member constituting the bonding structure may be in a poor condition due to occurrence of a crack or peeling phenomenon.

In addition, in the bonding structure between the housing and the display, since an amount of the adhesive material to be applied is decreased due to the reduced mounting portion, bonding strength of the adhesive material which bonds between the front plate and the mounting portion may be decreased.

Aspects of the disclosure are to address at least the above-mentioned problems and/or disadvantages and to provide at least the advantages described below. Accordingly, an aspect of the disclosure is to provide an electronic device including a bonding structure robust to an impact such as falling or the like.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front plate facing a first direction, a rear plate facing a second direction opposite to the first direction, and a lateral member surrounding a space between the front plate and the rear plate and at least partially constructed of a metal material.

The front plate may include a first edge having a first length and extending in a third direction, a second edge having a second length longer than the first length and extending in a fourth direction orthogonal to the third direction, a third edge parallel to the first edge, having the first length, and extending in the third direction from the second edge, a fourth edge parallel to the second edge, having the second length, and extending in the fourth direction from the first edge, a first region in which the third edge and the fourth edge meet, and a second region in which the second edge and the third edge meet.

The electronic device may include a display viewable through the front plate, and an adhesive layer constructed in a closed-curve shape along the first edge, second edge, third edge, and fourth edge of the front plate. When viewed from above the display, a width of the adhesive layer in the first region and the second region may be greater than a width of the adhesive layer outside the first region and the second region.

In accordance with another aspect of the disclosure, an electronic device is provided. The electronic device includes a housing including a front plate facing a first direction, a rear plate facing a second direction opposite to the first direction, and a lateral member surrounding a space between the front plate and the rear plate and at least partially constructed of a metal material.

The front plate may include a first edge having a first length and extending in a third direction, a second edge having a second length longer than the first length and extending in a fourth direction orthogonal to the third direction, a third edge parallel to the first edge, having the first length, and extending in the third direction from the second edge, a fourth edge parallel to the second edge, having the second length, and extending in the fourth direction from the first edge, a first region in which the third edge and the fourth edge meet, and a second region in which the second edge and the third edge meet.

The electronic device may include a display viewable through the front plate, and an adhesive layer constructed in a closed-curve shape along the first edge, second edge, third edge, and fourth edge of the front plate. An intermediate plate included in the first region and the second region may include a material having a first water affinity. The adhesive layer may include a material having a second water affinity identical to similar to the first water affinity.

In accordance with another aspect of the disclosure, an electronic device is provided. The electronic device includes a housing including a front plate facing a first direction, a rear plate facing a second direction opposite to the first direction, and a lateral member surrounding a space between the front plate and the rear plate and at least partially constructed of a metal material, and including a mounting portion constructed along an edge, a display including a display module coupled to the front plate, and mounted to the front plate so that at least part thereof is viewable through the front plate, and a bonding structure attached between the mounting portion and the front plate to seal an inner portion of the housing. The bonding structure may include a first adhesive material applied along the mounting portion. When viewed from above the front plate, the first adhesive material may be applied such that a width of the first adhesive material applied to a mounting portion in a corner region of the housing is variable, compared to a width of the first adhesive material applied to a mounting portion in at least one non-corner region of the housing.

Various embodiments of the disclosure may provide an electronic device including a bonding structure (e.g., a waterproof structure and/or a dustproof structure) robust to an impact such as falling or the like.

Various embodiments of the disclosure may provide an electronic device including a bonding structure capable of self-restoration.

Various embodiments of the disclosure may provide an electronic device capable of improving bonding strength by expanding a region of a hydrophilic material in a mounting portion.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the disclosure may include at least one of, for example, a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, or a wearable device (e.g., smart glasses, a Head-Mounted Display (HMD), electronic clothes, an electronic bracelet, an electronic necklace, an electronic appcessory, an electronic tattoo, a smart mirror, or a smart watch).

Figure 1:
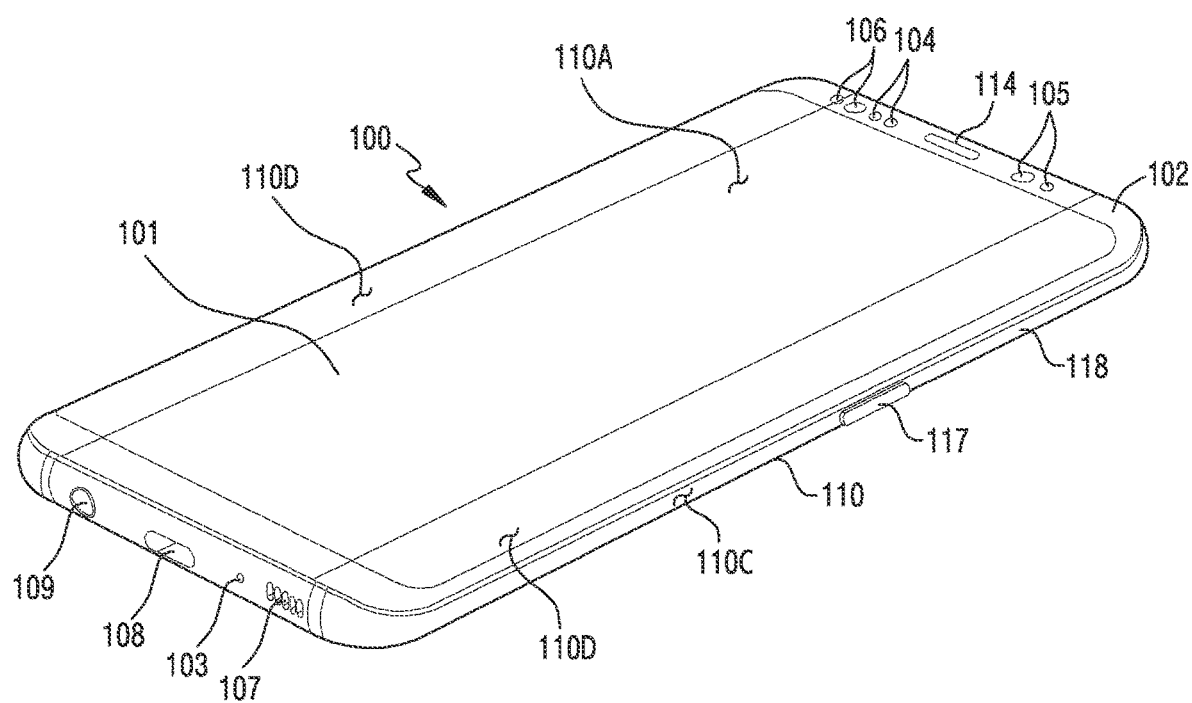
FIG. 1 is a perspective view illustrating a front face of a mobile electronic device according to an embodiment of the disclosure.

FIG. 1 is a perspective view illustrating a front face of a mobile electronic device according to an embodiment of the disclosure.

Figure 2:
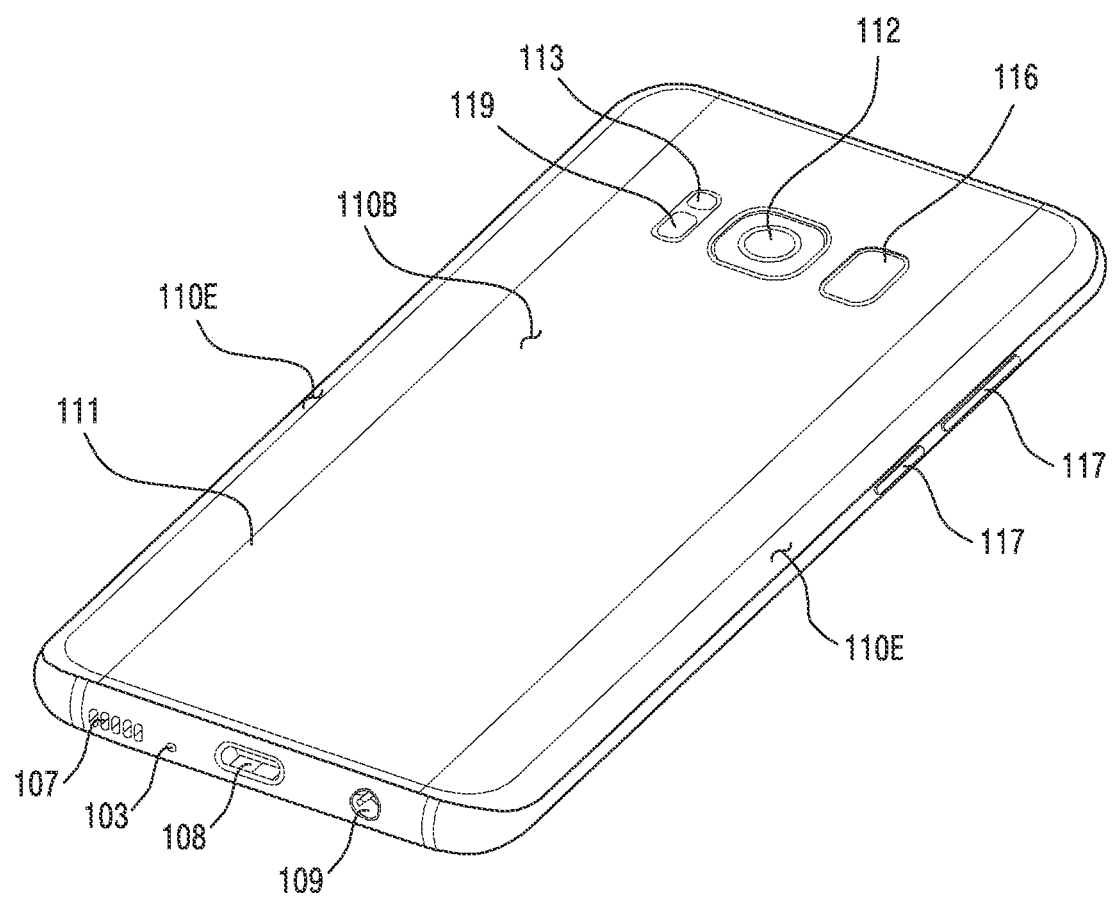
FIG. 2 is a perspective view illustrating a rear face of the electronic device of FIG. 1 according to an embodiment of the disclosure.

FIG. 2 is a perspective view illustrating a rear face of the electronic device of FIG. 1 according to an embodiment of the disclosure.

Referring to FIGS. 1 and 2, an electronic device 100 according to an embodiment may include a housing 110 including a first face (or a front face) 110A, a second face (or a rear face) 110B, and a lateral face 110C surrounding a space between the first face 100A and the second face 110B. In another embodiment (not shown), the housing may refer to a construction which constitutes part of the first face 110A, second face 110B, and lateral face 110C of FIG. 1. According to an embodiment, the first face 110A may be constructed of a front plate 102 (e.g., a polymer plate or a glass plate having various coating layers) which is at least partially transparent in practice. The second face 110B may be constructed of a rear plate 111 which is opaque in practice. For example, the rear plate 111 may be constructed of coated or colored glass, ceramic, polymer, metallic materials (e.g. aluminum, stainless steel (STS), or magnesium) or a combination of at least two of these materials. The lateral face 110C may be constructed of a lateral bezel structure (or a lateral member) 118 bonded to the front plate 102 and the rear plate 111 and including metal and/or polymer. In some embodiments, the rear plate 111 and the lateral bezel structure 118 may be constructed integrally and may include the same material (e.g., a metallic material such as aluminum).

In the illustrated embodiment, the front plate 102 may include two first regions 110D seamlessly extended by being bent from the first face 110A toward the rear plate 111 at both ends of a long edge of the front plate 102. In the illustrated embodiment (see FIG. 2), the rear plate 111 may include two second regions 110E seamlessly extended by being bent from the second face 110B toward the front plate 102 at both ends of a long edge. In some embodiments, the front plate 102 (or the rear plate 111) may include only one of the first regions 110D (or the second regions 110E). In another embodiment, some of the first regions 110D or the second regions 110E may not be included. In the above embodiments, in a lateral view of the electronic device 100, the lateral bezel structure 118 may have a first thickness (or width) at a lateral face in which the first regions 110D or the second regions 110E are not included, and may have a second thickness thinner than the first thickness at a lateral face in which the first regions 110D or the second regions 110E are included.

According to an embodiment, the electronic device 100 may include at least one or more of a display 101, audio modules 103, 107, and 114, sensor modules 104, 116, and 119, camera modules 105, 112, and 113, a key input device 117, a light emitting element 106, and connector holes 108 and 109. In some embodiments, the electronic device 100 may omit at least one of components (e.g., the key input device 117 or the light emitting element 106), or other components may be additionally included.

The display 101 may be exposed through, for example, some portions of the front plate 102. In some embodiments, at least part of the display 101 may be exposed through the first face 110A and the front plate 102 constructing the first regions 110D of the lateral face 110C. In some embodiments, a corner of the display 101 may be constructed to be substantially the same as an outer boundary adjacent to the front plate 102. In another embodiment (not shown), in order to expand an area in which the display 101 is exposed, the display 101 and the front plate 102 may be constructed to have substantially the same interval between outer boundaries thereof.

In another embodiment (not shown), a portion of a screen display region of the display 101 may have a recess or opening, and may include at least one or more of the audio module 114, sensor module 104, camera module 105, and light emitting element 106 which are aligned with the recess or the opening may be included. In another embodiment (not shown), at least one of the audio module 114, the sensor module 104, the camera module 105, the fingerprint sensor 116, or the light emitting element 106 may be included in a rear face of the screen display region of the display 101. In another embodiment (not shown), the display 101 may be disposed adjacent to or joined with a touch sensing circuit, a pressure sensor capable of measuring touch strength (pressure), and/or a digitizer for detecting a magnetic-type stylus pen. In some embodiments, at least part of the sensor modules 104 and 119 and/or at least part of the key input device 117 may be disposed to the first regions 110D and/or the second regions 110E.

The audio modules 103, 107, and 114 may include the microphone hole 103 and the speaker holes 107 and 114. The microphone hole 103 may have a microphone disposed inside thereof to acquire external sound, and in some embodiments, may have a plurality of microphones disposed to sense a sound direction. The speaker holes 107 and 114 may include the external speaker hole 107 and the communication receiver hole 114. In some embodiments, the speaker holes 107 and 114 and the microphone hole 103 may be implemented with one hole, or the speaker may be included without the speaker holes 107 and 114 (e.g., a Piezo speaker).

The sensor modules 104, 116, and 119 may generate an electrical signal or data value corresponding to an internal operational state of the electronic device 100 or an external environmental state. The sensor modules 104, 116, and 119 may include, for example, the first sensor module 104 (e.g., a proximity sensor) and/or second sensor module (not shown) (e.g., a fingerprint sensor) disposed to the first face 110A of the housing 110, and/or the third sensor module 119 (e.g., a Heart Rate Monitoring (HRM) sensor) disposed to the second face 110B of the housing 110 and/or the fourth sensor module 116 (e.g., a fingerprint sensor). The fingerprint sensor may be disposed not only to the first face 110A (e.g., the display 101) but also the second face 110B of the housing 110. The electronic device 100 may further include at least one of senor modules (not shown), for example, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, or an illuminance sensor.

The camera modules 105, 112, and 113 may include the first camera module 105 disposed to the first face 110A of the electronic device 100, the second camera module 112 disposed to the second face 110B, and/or the flash 113. The camera module 105 and 112 may include one or more lenses, an image sensor, and/or an image signal processor. The flash 113 may include, for example, a Light Emitting Diode (LED) or a xenon lamp. In some embodiments, two or more lenses (wide angle and telephoto lenses) and image sensors may be disposed to one face of the electronic device 100.

The key input device 117 may be disposed to the lateral face 110C of the housing 110. In another embodiment, the electronic device 100 may not include the entirety or part of the aforementioned key input device 117. The key input device 117, which is not included, may be implemented on a display 101 in a different form such as a soft key or the like. In some embodiments, the key input device may include the sensor module 116 disposed to the second face 110B of the housing 110.

The light emitting element 106 may be disposed, for example, to the first face 110A of the housing 110. The light emitting element 106 may provide, for example, state information of the electronic device 100 in an optical form. In another embodiment, the light emitting element 106 may provide, for example, a light source interworking with an operation of the camera module 105. The light emitting element 106 may include, for example, an LED, an infrared (IR) LED, and a xenon lamp.

The connector holes 108 and 109 may include the first connector hole 108 capable of housing a connector (e.g., a Universal Serial Bus (USB) connector) for transmitting/receiving power and/or data of an external electronic device and/or the second connector hole (e.g., earphone jack) 109 capable of housing a connector for transmitting/receiving an audio signal with respect to the external electronic device.

Figure 3:
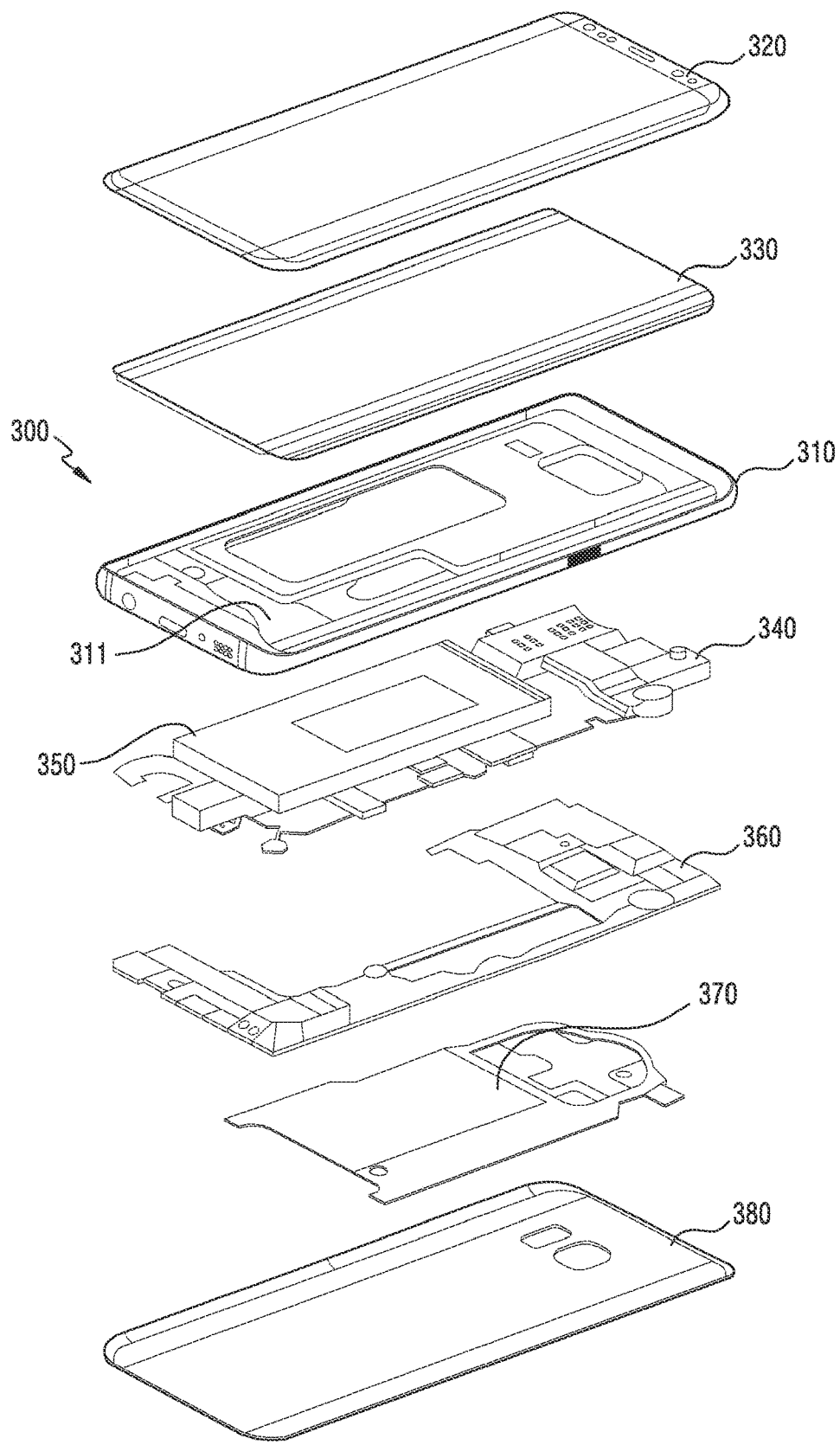
FIG. 3 is an exploded perspective view illustrating an inner structure of the electronic device of FIG. 1 according to an embodiment of the disclosure.

FIG. 3 is an exploded perspective view illustrating an inner structure of the electronic device of FIG. 1 according to an embodiment of the disclosure.

Referring to FIG. 3, an electronic device 300 may include a lateral bezel construction 310, a first support member 311 (e.g., a bracket), a front plate 320, a display 330, a Printed Circuit Board (PCB) 340, a battery 350, a second support member 360 (e.g., a rear case), an antenna 370, and a rear plate 380. In some embodiments, the electronic device 300 may omit at least one (e.g., the first support member 311) of these components, or may additionally include other components. At least one of the components of the electronic device 300 may be the same as or similar to at least one of the components of the electronic device 100 of FIG. 1 or FIG. 2, and redundant descriptions will be omitted hereinafter.

The first support member 311 may be coupled with the lateral bezel construction 310 by being disposed inside the electronic device 300, or may be constructed integrally with respect to the lateral bezel construction 310. The first support member 311 may be constructed of, for example, a metal material and/or non-metal material (e.g., polymer). The display 330 may be coupled to one side of the first support member 311, and the PCB 340 may be coupled to the other side thereof. A processor, a memory, and/or an interface may be mounted on the PCB 340. The processor may include, for example, one or more of a central processing unit, an application processor, a graphic processing unit, an image signal processor, a sensor hub processor, and a communication processor.

The memory may include, for example, a volatile memory or a non-volatile memory.

The interface may include, for example, a High Definition Multimedia Interface (HDMI), a Universal Serial Bus (USB) interface, a Secure Digital (SD) card interface, and/or an audio interface. For example, the interface may electrically or physically couple the electronic device 300 and the external electronic device, and may include a USB connector, an SD card/Multi Media Card (MMC) connector, or an audio connector.

As a device for supplying power to at least one component of the electronic device 300, the battery 350 may include, for example, a non-rechargeable primary cell, a rechargeable secondary cell, or a fuel cell. At least one portion of the battery 350 may be disposed on the same plane substantially with respect to, for example, the PCB 340. The battery 350 may be disposed integrally inside the electronic device 300, or may be detachably disposed with respect to the electronic device 300.

The antenna 370 may be disposed between the rear plate 380 and the battery 350. The antenna 370 may include, for example, a Near Field Communication (NFC) antenna, a wireless charging antenna, and/or a Magnetic Secure Transmission (MST) antenna. The antenna 370 may perform NFC, for example, with the external electronic device, or may wirelessly transmit/receive power used for charging. In another embodiment, an antenna construction may be constructed by at least part of the lateral bezel construction 310 and/or the first support member 311 or a combination thereof.

Figure 4:
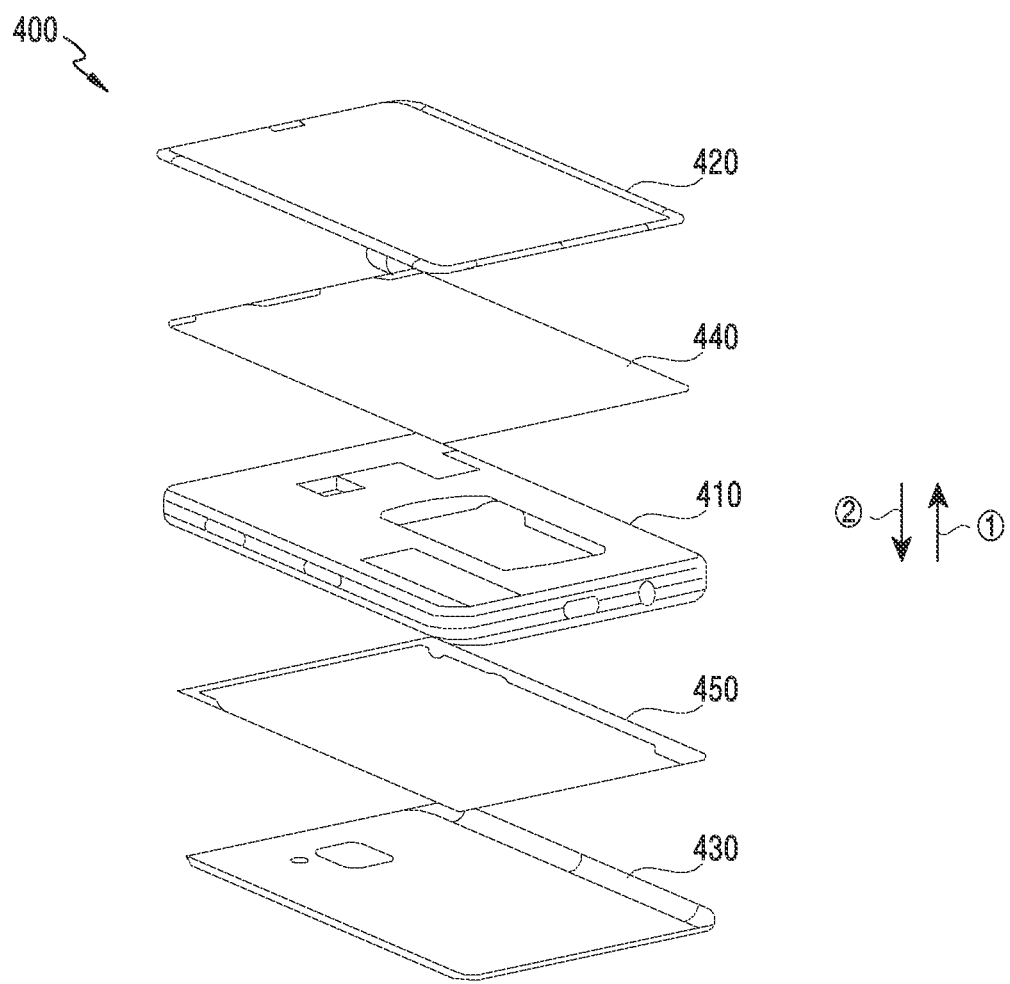
FIG. 4 is an exploded perspective view illustrating an electronic device having a bonding structure according to an embodiment of the disclosure.

FIG. 4 is an exploded perspective view illustrating an electronic device having a bonding structure according to an embodiment of the disclosure.

Referring to FIG. 4, an electronic device 400 (e.g., the electronic device 100 of FIG. 1, the electronic device 300 of FIG. 3) having a bonding structure according to various embodiments may include one housing 410. According to an embodiment, the housing 410 (e.g., the housing 110 of FIG. 1, the lateral bezel construction 310 of FIG. 3) may include an intermediate plate (e.g., a bracket or a support member) (e.g. the support member 311 of FIG. 3), first and second plates 420 and 430 (e.g., the front plate 320 and rear plate 380 of FIG. 3), a first adhesive material 440, and a second adhesive material 450.

According to an embodiment, the first plate 420 may be attached by means of the adhesive material 440 in a first direction ① of the housing 410, and the second plate 430 may be attached by means of the second adhesive material 450 in a second direction ② of the housing 410. A first bonding structure may be implemented between the first plate 420 and one face of the housing 410 by means of the adhesive material 440. A second bonding structure may be implemented between the second plate 430 and the other face of the housing 410 by means of the second adhesive material 450. The bonding structure between the first plate 420 and one face of the housing 410 may be a first waterproof/dustproof structure, and the bonding structure between the second plate 430 and the other face of the housing 410 may be a second waterproof/dustproof structure. For example, the first plate 420 may include a front plate, and the second plate 430 may include a rear plate or a back cover.

According to an embodiment, the first adhesive material 440 may include an adhesive liquid, and the second adhesive material 450 may include a tape. For example, the adhesive liquid may be an adhesive material which is cured after being applied to some faces of the housing 410, and the second adhesive material 450 may include a double-sided tape. The adhesive material 440 may be cured by being applied along one face of the housing 410, and the adhesive material 440 may have a closed-curve shape when viewed from above the housing 410. The second adhesive material 450 may be attached along the other face in a direction opposite to the face of the housing 410, and may have a closed-curve shape when viewed from above the housing 410.

The first adhesive material 440 according to an embodiment may be used to seal between the housing 410 and the first plate 420, and the second adhesive material 450 may be used to seal between the housing 410 and the second plate 430. For example, at least part of the first plate 420 may include a window of a transparent material, and at least part of the second plate 430 may include a window which is transparent, partially transparent, or entirely opaque.

Figure 5:
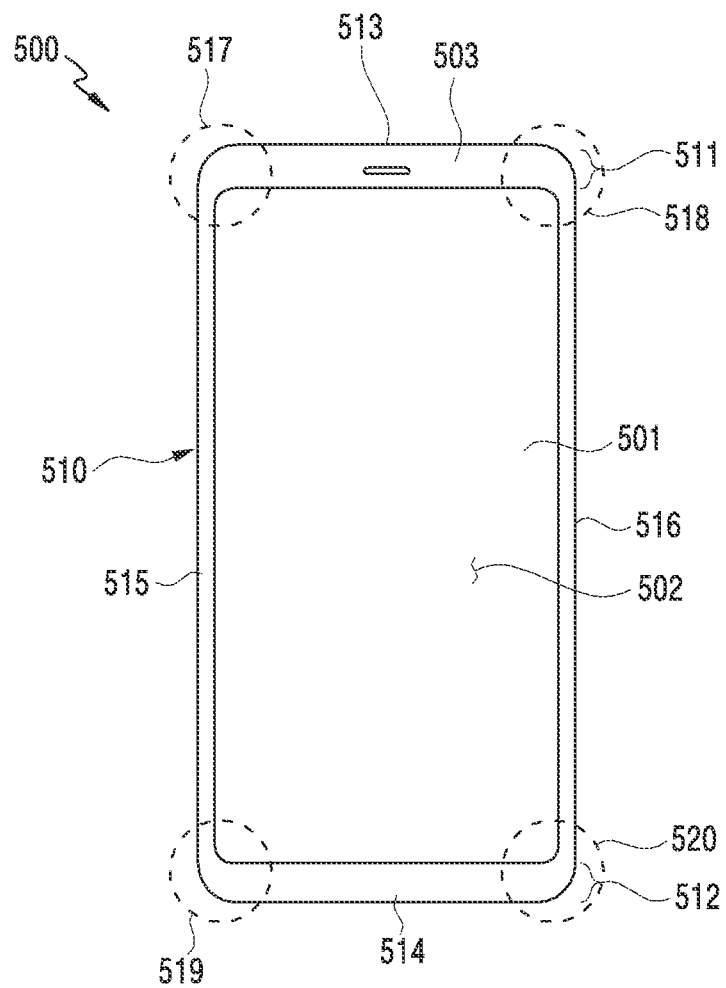
FIG. 5 is a plan view illustrating a front face of an electronic device according to an embodiment of the disclosure.

FIG. 5 is a plan view illustrating a front face of an electronic device according to an embodiment of the disclosure.

Referring to FIG. 5, a first face of an electronic device 500 according to an embodiment may include a display region 502 and a Black Matrix (BM) region 503. The BM region 503 may surround a boundary of a display region 502, and when viewed from above the first face, may be disposed in a closed-curve shape. The display region 502 may be an active region, and the BM region 503 may be an inactive region.

In the electronic device 500 according to an embodiment, the inactive region may be disposed to an upper region 511 and a lower region 512 with a display 501 located in the center. The inactive region may be disposed along an edge which couples the upper and lower regions 511 and 512. A camera, a receiver, a sensor, and an LED may be disposed to the upper region 511, and at least part of a display driving chip, a flexible printed circuit board of a display mode, and/or a flexible printed circuit board of a touch screen may be disposed to the lower region 512.

A housing 510 according to an embodiment may have a substantially rectangular shape when viewed from above the first face. For example, the housing 510 may include four corner portions 517, 518, 519, and 520 and four edge portions 513, 514, 515, and 516. Each of the corner portions 517, 518, 519, and 520 may have a curved shape, and each of the edge portions 513, 514, 515, and 516 may have a rectangular shape. Regarding the corner portions according to various embodiments, the two corner portions 517 and 518 may be located at an upper end of the housing 510, and the two corner portions 519 and 520 may be located at a lower end.

Figure 6:
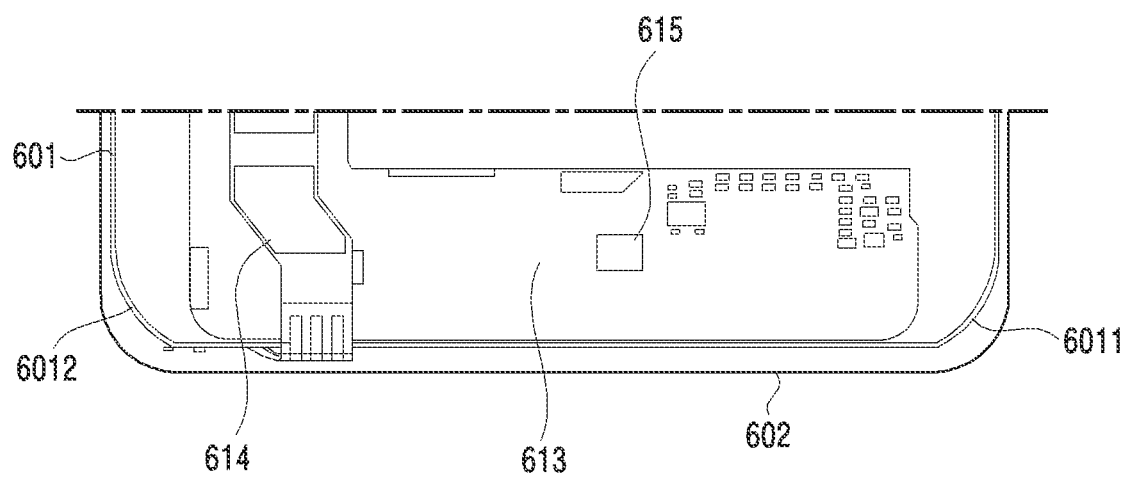
FIG. 6 illustrates a state in which a display panel is coupled to a front plate according to an embodiment of the disclosure.

FIG. 6 illustrates a state in which a display panel is coupled to a front plate according to an embodiment of the disclosure.

Referring to FIG. 6, according to an embodiment, a portion 614 of a flexible printed circuit board 613 of a display panel 601 may be bent at a lower region of a front plate 602. The portion 614 of the bent flexible printed circuit board may be disposed to be substantially parallel with the front plate 602. According to an embodiment, the display panel 601 may include a touch sensitive panel, and the flexible printed circuit board 613 may include a flexible printed circuit board of the touch sensitive panel. For example, a Display Driver Integrated Circuit (DDI) 615 may be disposed to the flexible printed circuit board 613.

According to an embodiment, among four corner portions of the display panel 601, two corner portions 6011 and 6012 located at a lower portion may be subjected to Round (R)-cutting. The display panel 601 may be coupled to the front plate 602 (e.g., a window).

According to an embodiment, the front plate 602 coupled to the display panel 601 may be attached to a housing (e.g., the housing 510 of FIG. 5) by means of an adhesive material.

Figure 7:
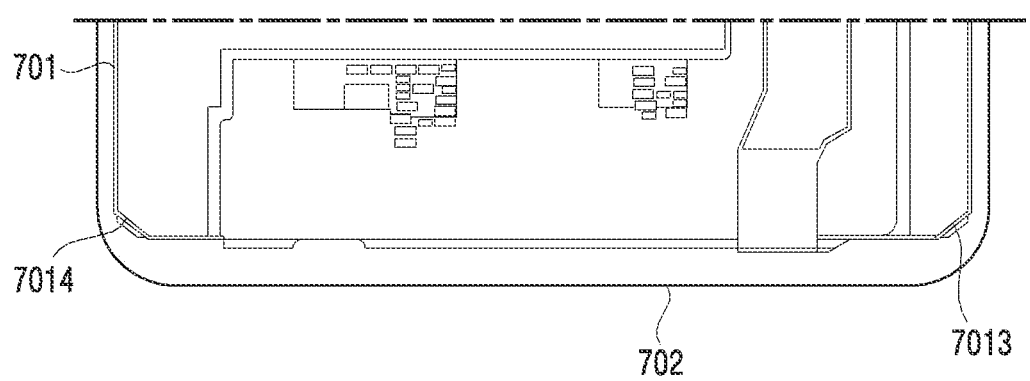
FIG. 7 illustrates a state in which a display panel is coupled to a front plate according to an embodiment of the disclosure.

FIG. 7 illustrates a state in which a display panel is coupled to a front plate according to an embodiment of the disclosure.

Referring to FIG. 7, since a display panel 701 according to various embodiments has the same structure as the display panel 601 of FIG. 6 except for a shape of a corner portion, descriptions thereof will be omitted to avoid redundancy.

According to an embodiment, among four corner portions of the display panel 701, two corner portions 7013 and 7014 located at a lower portion may be subjected to C-cutting. According to an embodiment, a front plate 702 coupled to the display panel 701 may be attached to a housing (e.g., the housing 510 of FIG. 5) by means of an adhesive material.

Figure 8A:
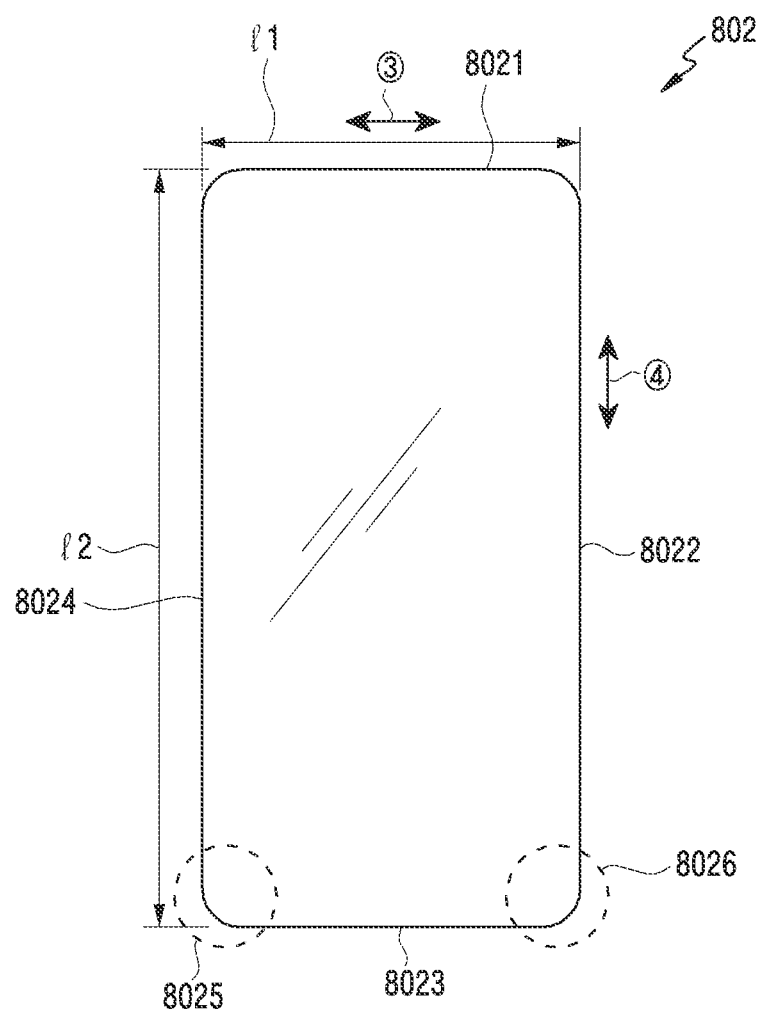
FIG. 8A is a plan view illustrating a front plate according to an embodiment of the disclosure.

FIG. 8A is a plan view illustrating a front plate according to an embodiment of the disclosure.

Referring to FIG. 8A, a front plate 802 according to various embodiments is a member disposed to a first face of an electronic device (e.g., the electronic device 100 of FIG. 1 or the electronic device 300 of FIG. 3). For example, the front plate 802 may include a substrate of a transparent material, i.e., a transparent window. For example, the front plate 802 may be constructed of any one of glass and synthetic resin.

The front plate 802 according to an embodiment may include first to fourth edges 8021, 8022, 8023, and 8024. The first edge 8021 may have a first length l1 and extend in a third direction ③. The second edge 8022 may have a second length l2 longer than the first length l1 and extend in a fourth direction ④ orthogonal to the third direction ③. The third edge 8023 may be parallel to the first edge 8021, have the first length l1, and extend in the third direction ③ from the second edge 8022. The fourth edge 8024 may be parallel to the second edge 8022, have the second length l2, and extend in the fourth direction ④ from the first edge 8021. For example, the first to fourth edges 8021, 8022, 8023, and 8024 may be coupled with one another to constitute a closed-curve shape. According to an embodiment, the front plate 802 may include a first region 8025 in which the third edge 8023 and the fourth edge 8024 meet and a second region 8026 in which the second edge 8022 and the third edge 8023 meet. For example, the first region 8025 may be a corner portion of one side located at a lower end of the front plate 802, and the second region 8026 may be a corner portion of the other side located at the lower end of the front plate.

The front plate 802 according to various embodiments may be a portion in which the first to fourth edges 8021, 8022, 8023, and 8024 and the first and second regions 8025 and 8026 are attached to part of a housing (e.g., the housing 510 of FIG. 5) by means of an adhesive material. For example, when viewed from above the front plate 802, the first to fourth edges 8021, 8022, 8023, and 8024 and the first and second regions 8025 and 8026 may have a closed-curve shape together, and an adhesive material applied to a closed loop shaped region may also have a closed-curve shape. The adhesive material may exist in a layer shape and in a rigid state between a portion of the housing and the first to fourth edges 8021, 8022, 8023, and 8024. If the adhesive material is cured after being applied to the portion of the housing and thus is present in a layer shape with a rigid material, it may be referred to as an adhesive member or an adhesive layer.

Figure 8B:
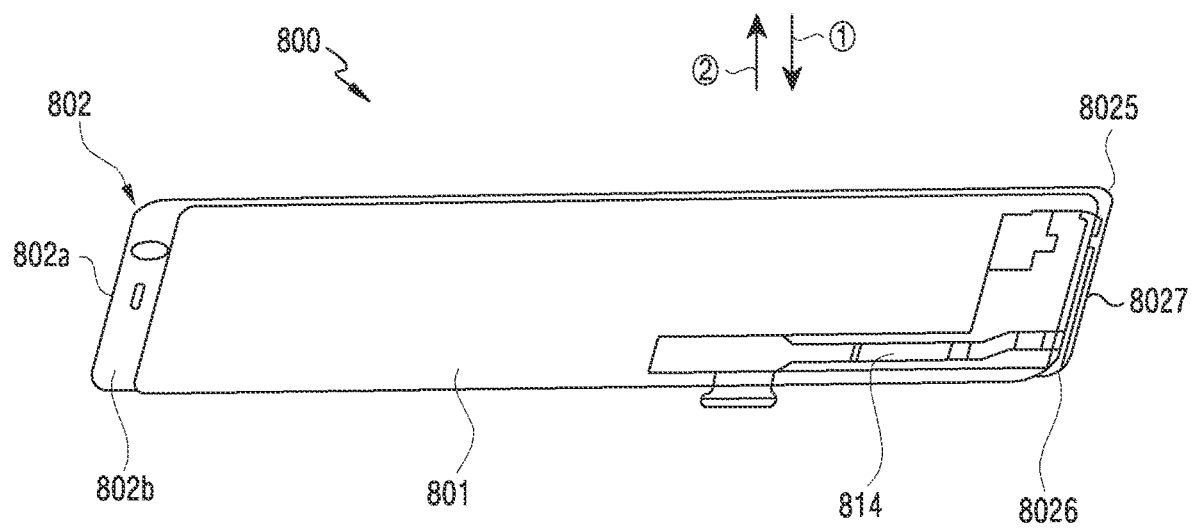
FIG. 8B is a perspective view illustrating a display according to an embodiment of the disclosure.

FIG. 8B is a perspective view illustrating a display according to embodiment of the disclosure of the disclosure.

Referring to FIG. 8B, a display 800 (e.g., the display 101 of FIG. 1 or the display 330 of FIG. 3) according to various embodiments may include a first face facing a first direction ① (e.g., the first direction ① of FIG. 4) and a second face facing a second direction ②(e.g., the second direction ② of FIG. 4) opposite to the first direction ①. When the display 800 is mounted to a housing, the first face of the display 800 may be an outer face, and the second face of the display 800 may be a face supported by an intermediate plate. According to an embodiment, the display 800 may include a front plate 802, a display panel 801, and a flexible printed circuit board 814.

According to an embodiment, the front plate 802 may include one face 802a facing the first direction ① and the other face 802b facing the second direction ② opposite to the first direction ①. One face 802a may be an outer face, and the other face 802b may be a face to which the display panel 801 is to be attached or is to face. According to an embodiment, a portion of the flexible printed circuit board 814 may be bent in a third region 8027 between first and second regions 8025 and 8026 of the front plate, and may be bent towards the second face of the display 800, that is, a face facing the second direction ② of the display panel 801.

Figure 8C:
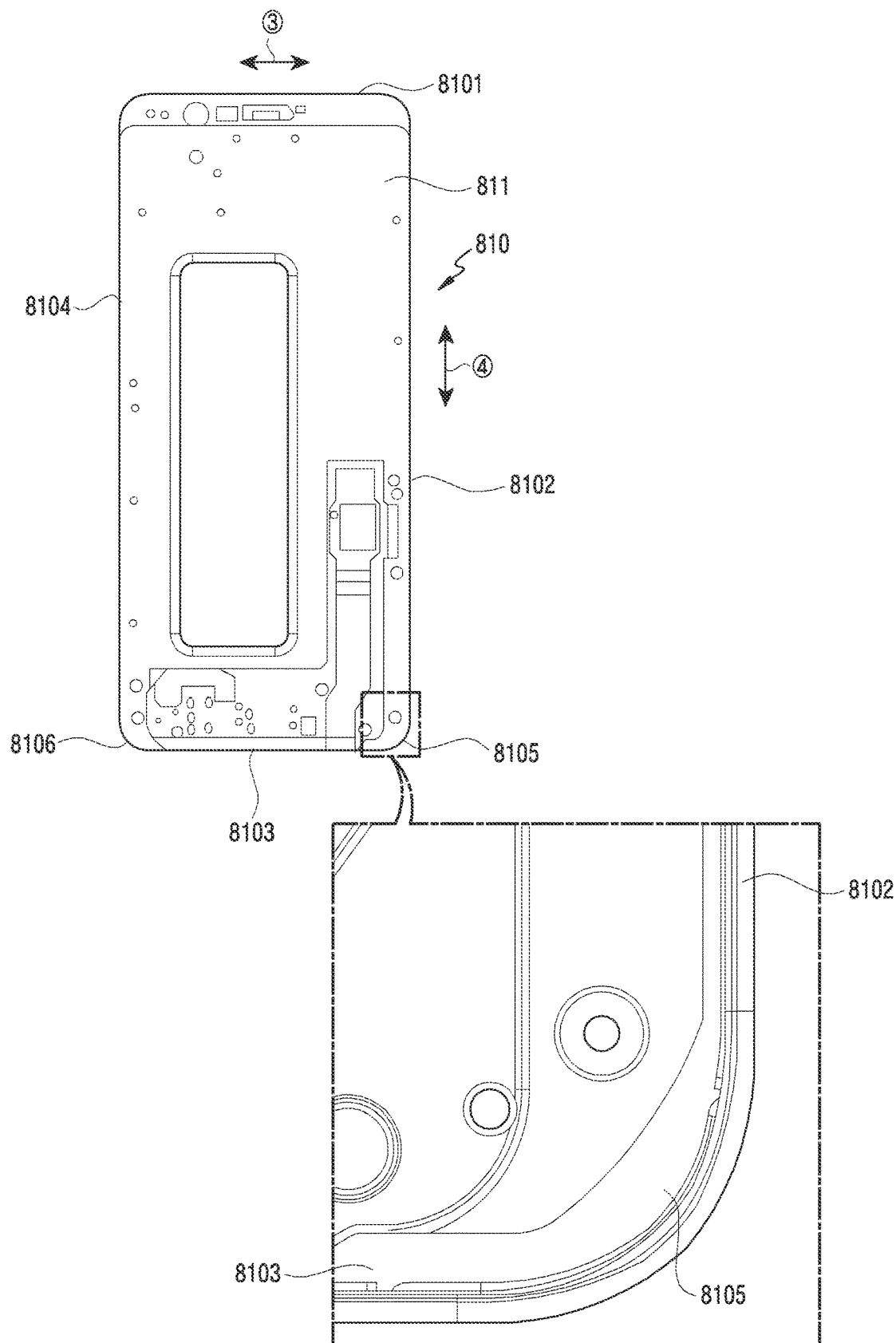
FIG. 8C is a plan view illustrating a housing to which a display is mounted according to an embodiment of the disclosure.

Referring to FIG. 8C, a housing 810 according to an embodiment may include first to fourth edge 8101 to 8104 along four sides. Rounded corner portions may exist respectively between the first to fourth edges 8101 to 8104.

According to an embodiment, the housing 810 may have mounting portions at the respective corner portions located between the first to fourth edges 8101 to 8104. According to an embodiment, first and second mounting portions 8105 and 8106 of both corner portions located at a lower end of the housing 810 may include a mounting area wider than a mounting portion located along the four first to fourth edges 8101 to 8104.

Figure 9:
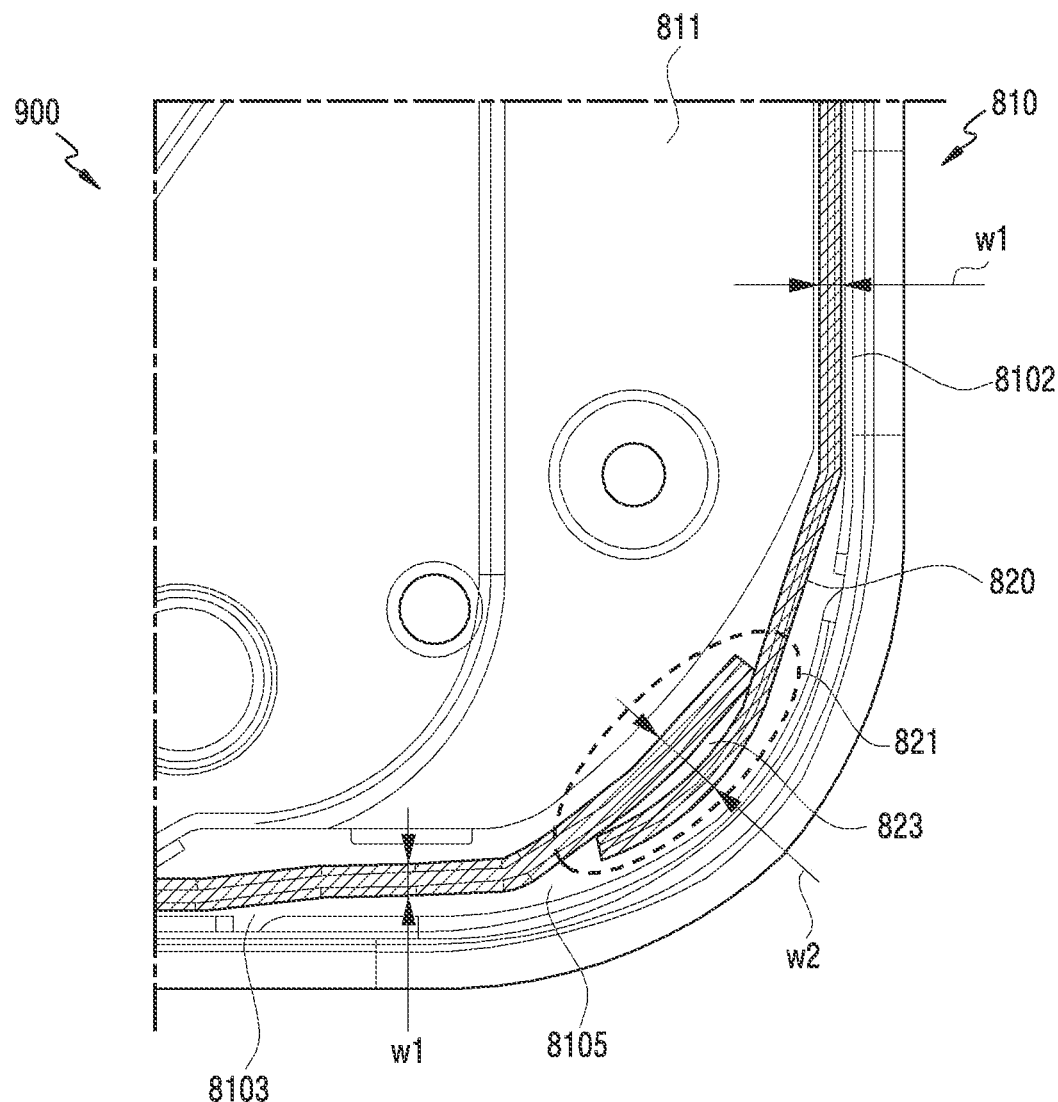
FIG. 9 illustrates a state in which a first adhesive material is applied to a mounting portion of a corner portion according to an embodiment of the disclosure.

FIG. 9 illustrates a state in which a first adhesive material is applied to a mounting portion of a corner portion according to an embodiment of the disclosure.

Referring to FIG. 9, in an electronic device 900 (e.g., the electronic device 100 of FIG. 1 or the electronic device 300 of FIG. 3) according to various embodiments, in order to expand a bonding area of first and second regions (e.g., the first and second regions 8025 and 8026 of FIG. 8A) of a front plate, an adhesive layer 820 constructed of a first adhesive material may be constructed such that a width w2 of the mounting portion 8105 located at a corner portion is greater than a width w1 constructed at a non-corner portion.

According to an embodiment, the adhesive layer 820 may be applied to mounting portions 8102 and 8103 in one line and may be applied to a mounting portion 8105 of the corner portion in two lines, thereby expanding the bonding area with respect to the first and second regions of the front plate.

For example, the mounting portion 8105 to which an adhesive material is applied in two lines may be a mounting portion (e.g., the first and second mounting portions 8105 and 8106 of FIG. 8C) of both corner portions located at a lower end of the housing. A portion 821 of the adhesive layer 820 applied in two lines may provide a robust bonding structure between the front plate and the housing by expanding the bonding area between the housing and the front plate.

Figure 10:
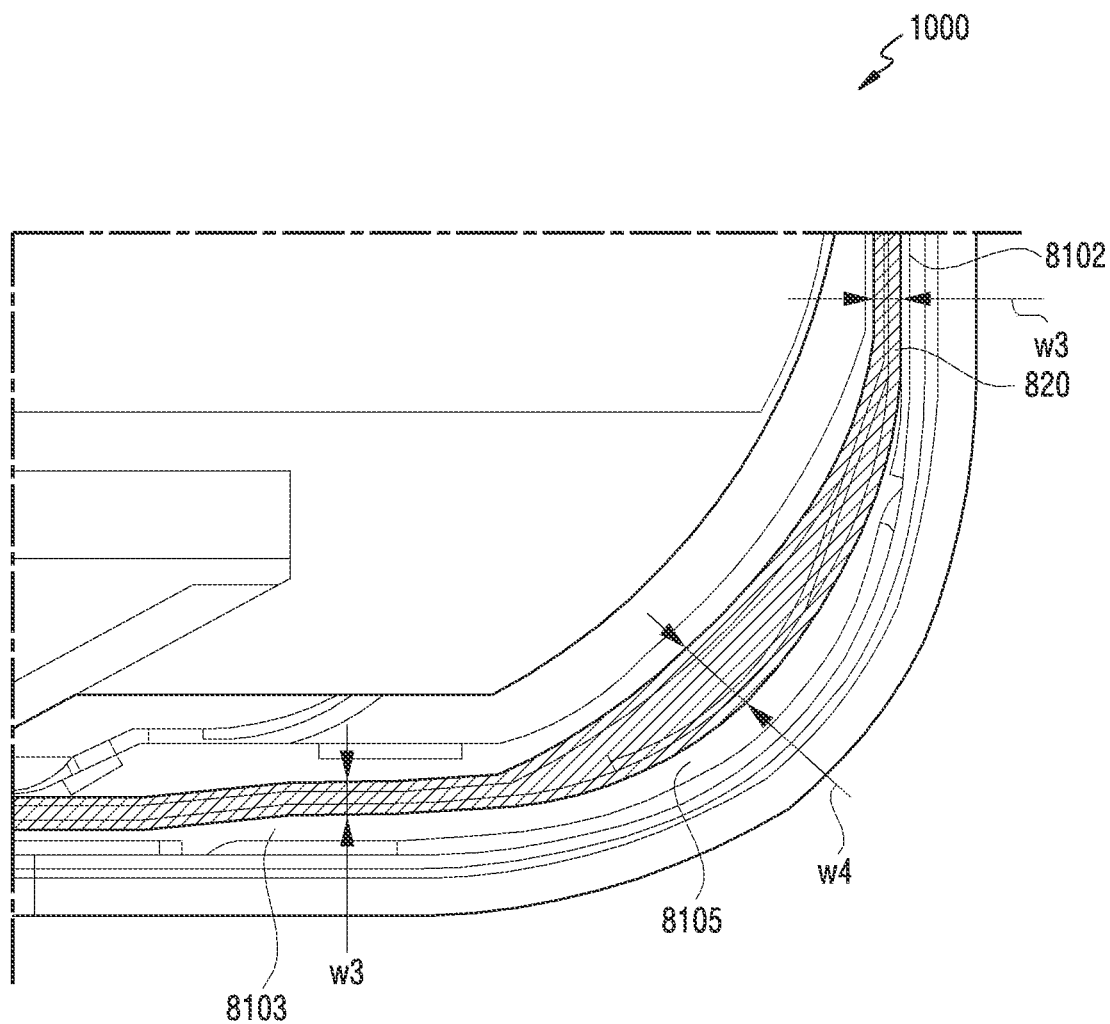
FIG. 10 illustrates another state in which a first adhesive material is applied to a mounting portion of a corner portion according to an embodiment of the disclosure.

FIG. 10 illustrates another state in which a first adhesive material is applied to a mounting portion of a corner portion according to an embodiment of the disclosure.

Referring to FIG. 10, in an electronic device 1000 (e.g., the electronic device 100 of FIG. 1 or the electronic device 300 of FIG. 3), in order to expand a bonding area of first and second regions (e.g., the first and second regions 8025 and 8026 of FIG. 8A) of a front plate, an adhesive layer 820 constructed of a first adhesive material may be applied to a mounting portion 8105 at a corner portion such that a width w4 is variable, compared to a width w3 of mounting portions 8102 and 8103 located at a non-corner portion. According to an embodiment, it may be applied such that the width w4 is greater than the width w3.

Since it may be applied such that the width w4 of the corner portion is relatively greater than the width w3 of the non-corner portion, a bonding area between the housing and the front plate is expanded, thereby providing a robust bonding structure (e.g., a waterproof structure and/or a dustproof structure) between the front plate and the housing.

According to an embodiment, in the adhesive layer 820, a bonding area may be expanded by allowing the applied thickness of the mounting portion 8105 located at the corner portion to be greater than the applied thickness of the mounting portion located at the second and third edges 8102 and 8103.

Figure 11:
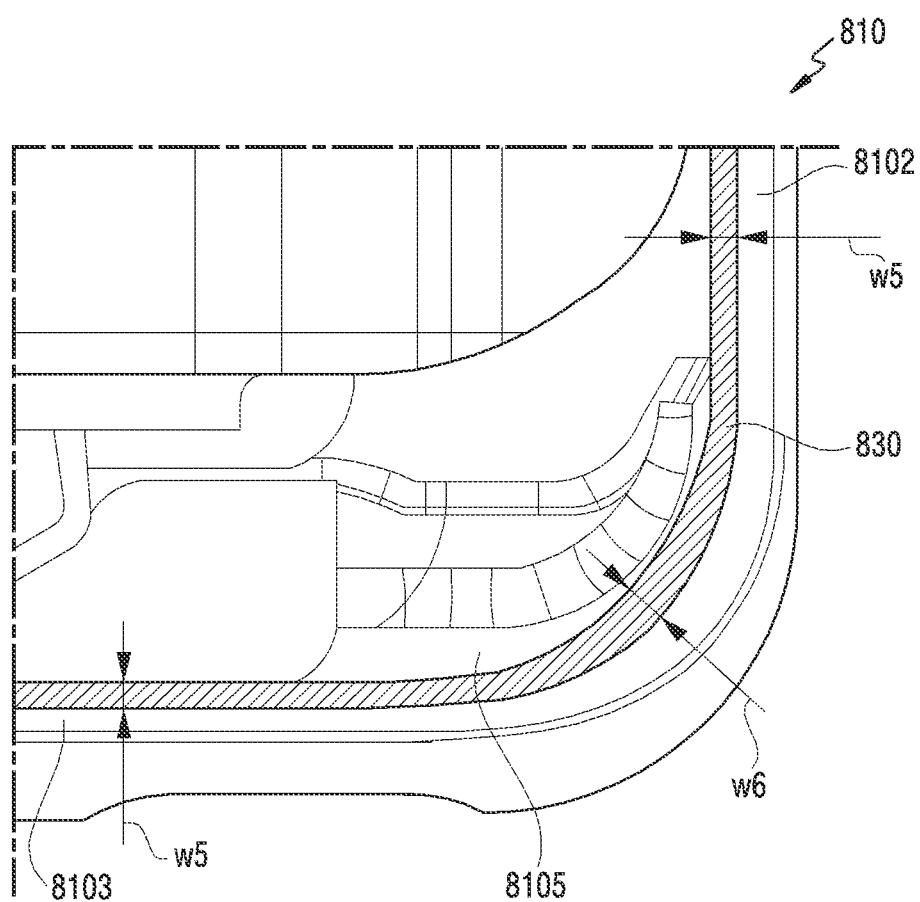
FIG. 11 illustrates a groove to which an adhesive material is applied to apply a first adhesive material to a mounting portion of a corner portion according to an embodiment of the disclosure.

FIG. 11 illustrates a groove to which an adhesive material is applied to apply a first adhesive material to a mounting portion of a corner portion according to an embodiment of the disclosure.

Referring to FIG. 11, a region 830 to which an adhesive material is applied may be pre-designed in mounting portions 8102, 8103, and 8105 of a housing 810 according to various embodiments. For example, the adhesive material may be applied to be filled in the groove, by applying a region pre-designed in the mounting portions 8102, 8103, and 8105, for example, a structure such as the groove. The groove may be constructed such that a width w6 of a groove of the mounting portion 8105 of the corner portion is greater than a width w5 of a groove of a mounting portion of the non-corner portion.

Figure 12A:
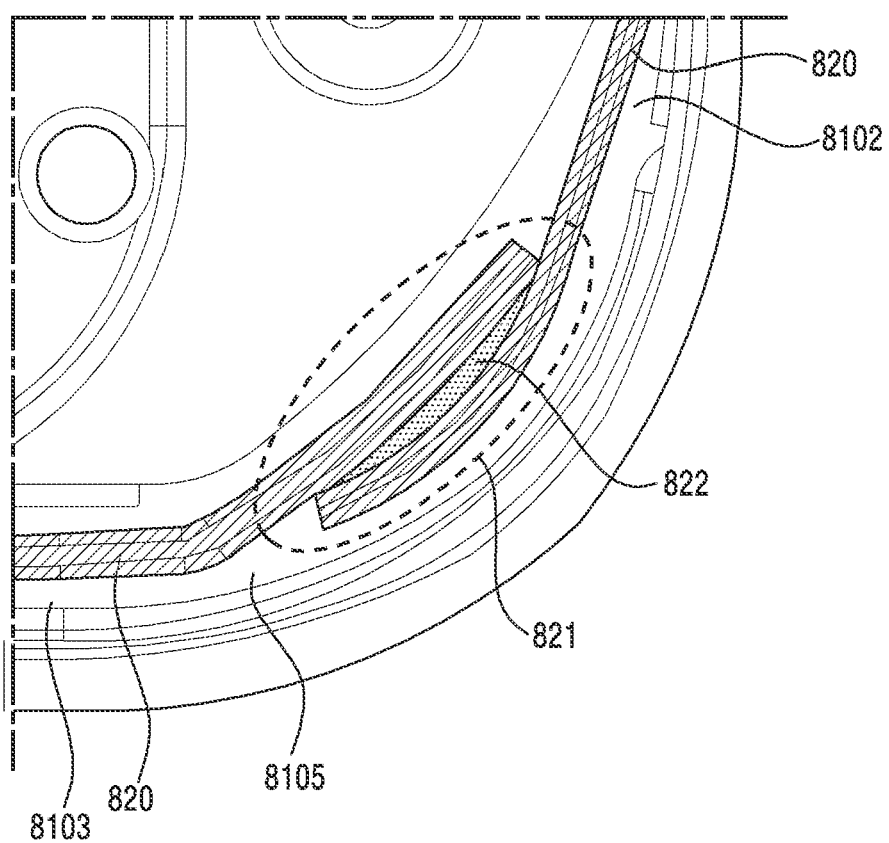
FIG. 12A is a partially enlarged view illustrating a state in which a first adhesive material is applied to a mounting portion according to an embodiment of the disclosure.

FIG. 12A is a partially enlarged view illustrating a state in which a first adhesive material is applied to a mounting portion according to an embodiment of the disclosure.

Figure 12B:
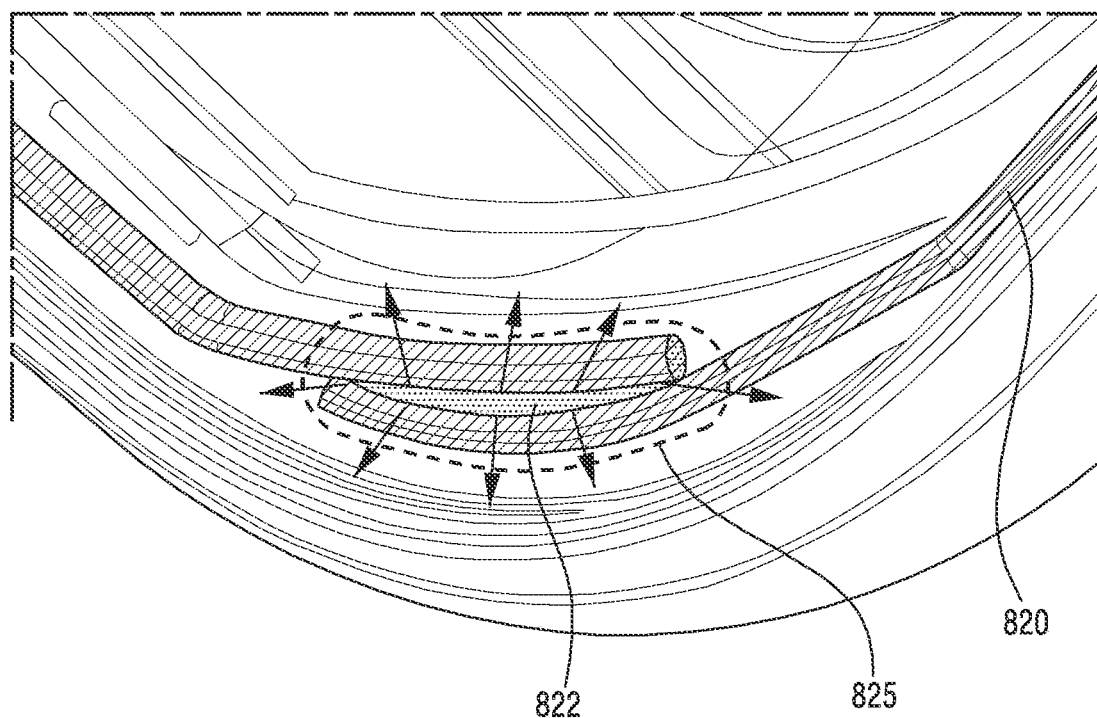
FIG. 12B illustrates a state in which a crack occurs in a first adhesive material applied to a mounting portion, and a second adhesive material leaks through the crack according to an embodiment of the disclosure.

FIG. 12B illustrates a state in which a crack occurs in a first adhesive material applied to a mounting portion, and a second adhesive material leaks through the crack according to an embodiment of the disclosure.

Figure 12C:
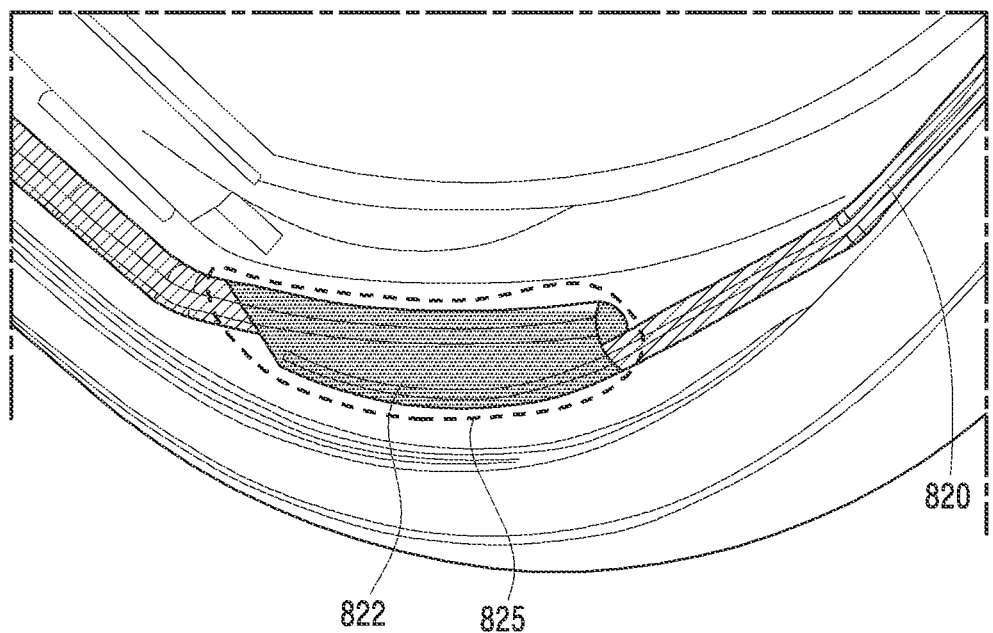
FIG. 12C illustrates a bonding structure constructed on a mounting portion by means of a self-restoration structure after an electronic device falls according to an embodiment of the disclosure.

FIG. 12C illustrates a bonding structure constructed on a mounting portion by means of a self-restoration structure after an electronic device falls according to an embodiment of the disclosure.

Referring to FIG. 12A, an adhesive material applied to a mounting portion 8105 according to various embodiments may include a first adhesive material 820 and a second adhesive material 822 different from the first adhesive material 820. The first adhesive material 820 may be applied to mounting portions 8102 and 8103 of a non-corner region in one line, and may be applied to the mounting portion 8105 of a corner region in two lines. An opening (e.g., the opening 823 of FIG. 9) may be constructed at a portion 821 to which the first adhesive material 820 is applied in two lines. An opening 823 may be an inner space to which the second adhesive material 822 is applied and filled. The first adhesive material 820 may include any one adhesive material among a hot-melt adhesive liquid and a 2-component adhesive liquid. For example, the first adhesive material 820 may include at least one of acrylate, silicone, urethane, thermoplastic, or epoxy.

In an embodiment, the second adhesive material 822 may include a wet curing adhesive liquid, as part of a self-restoration structure of a bonding structure. When the first adhesive material 820 is destroyed by an impact imposed on a portion of the electronic device due to falling of the electronic device, the second adhesive material 822 may flow out through the crack of the first adhesive material to fill the crack and then may be cured in contact with moisture in the air. The cured second adhesive material 822 may restore an adhesive layer. The second adhesive material 822 may be surrounded by at least part of the first adhesive material 820, or may be entirely surrounded.

Referring to FIG. 12B, due to the impact such as falling or the like, a first adhesive material 820 may be cracked or peeled, and a second adhesive material 822 may be leaked due to the crack and peeling. An arrow direction indicates a flow of the second adhesive material 822.

Referring to FIG. 12C, a bonding structure may be restored by curing a second adhesive material 822 leaked through a crack of a first adhesive material 820.

Each of the destroyed first adhesive materials 820 may be combined as one body by means of the second adhesive material 822. The first and second adhesive materials 820 and 822 may be combined into one body to construct an adhesive closed-curve structure 825, thereby restoring the bonding structure.

A self-restoration process of a bonding structure according to various embodiments will be described with reference to FIG. 13.

Figure 13:
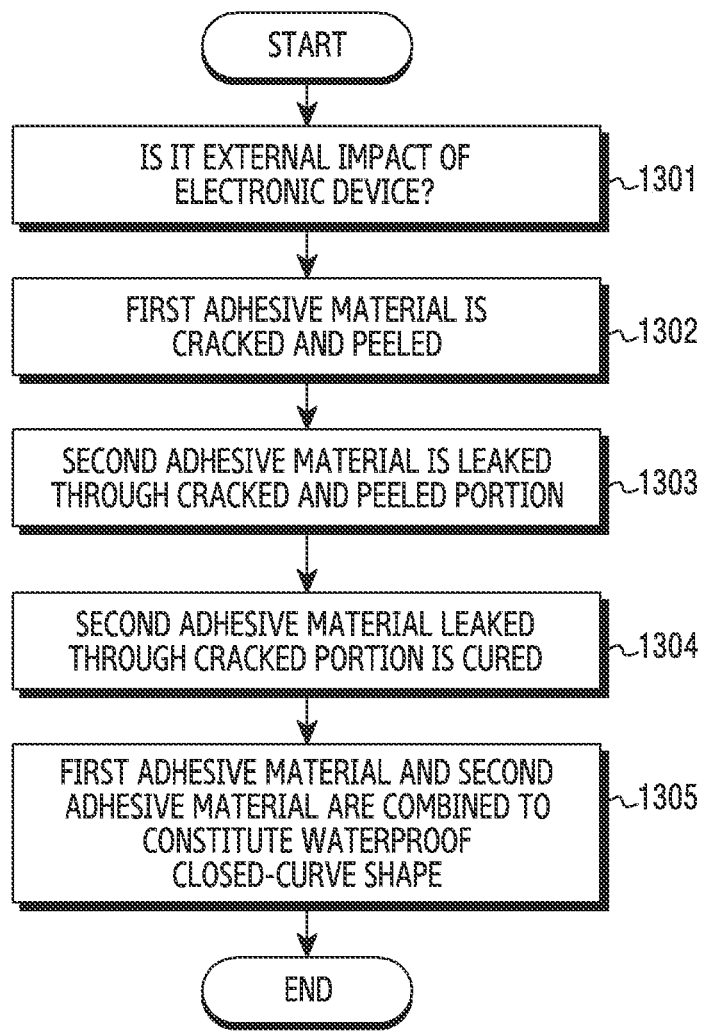
FIG. 13 is a flowchart sequentially showing a self-restoration structure of a bonding structure constructed in a mounting portion of a housing according to an embodiment of the disclosure.

FIG. 13 is a flowchart sequentially showing a self-restoration structure of a bonding structure constructed in a mounting portion of a housing according to an embodiment of the disclosure.

Referring to FIG. 13, an electronic device (e.g., the electronic device 100 of FIG. 1 or the electronic device 300 of FIG. 3) may inadvertently fall to the ground, and in particular, a portion (e.g., a corner) of the housing of the electronic device may be most impacted (operation 1301).

In a state where a second adhesive material (e.g., the second adhesive material 822 of FIG. 12A) sealed by two lines of a first adhesive material (e.g., the first adhesive material 820 of FIG. 12A) constructed in the mounting portion of the housing maintains a liquid state, the first adhesive material may be cracked (ruptured) and peeled due to an impact (operation 1302).

Due to an impact such as falling or the like, the first adhesive material (e.g., the first adhesive material 820 of FIG. 12A) may be cracked or peeled, and the second adhesive material (e.g., the second adhesive material 822 of FIG. 12A) leaked due to the crack and the peeling may flow out to be in contact with the air (operation 1303).

The second adhesive material (e.g., the second adhesive material 822 of FIG. 12A) leaked through the crack of the first adhesive material (e.g., the first adhesive material 820 of FIG. 12A) may be cured to restore the bonding structure (operation 1304).

The second adhesive material (e.g., the second adhesive material 822 of FIG. 12A) may be combined with the first adhesive material (e.g., the first adhesive material 820 of FIG. 12A). The first and second adhesive materials may be combined to construct the bonding structure (e.g., the adhesive closed-curve structure 825 of FIG. 12C), thereby restoring the bonding structure (operation 1305).

Figure 14:
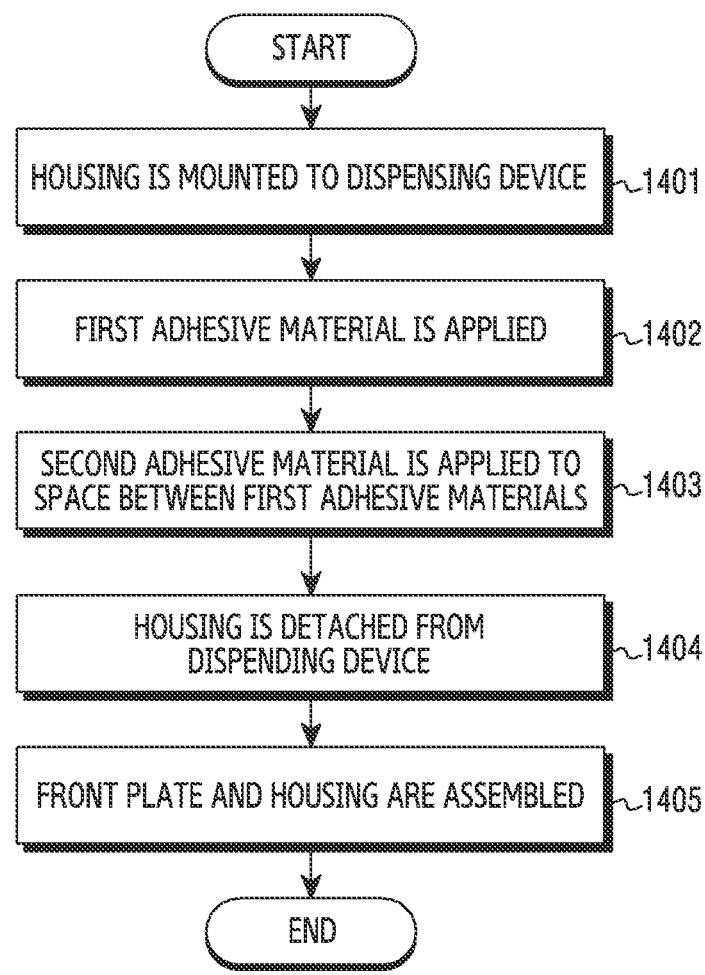
FIG. 14 is a flowchart illustrating a procedure of manufacturing a self-restoration structure by applying first and second adhesive materials to a mounting portion according to an embodiment of the disclosure.

FIG. 14 is a flowchart illustrating a procedure of manufacturing a self-restoration structure by applying first and second adhesive materials to a mounting portion according to an embodiment of the disclosure.

Referring to FIG. 14, a procedure of manufacturing a bonding structure constructed between first and second regions (e.g., the first and second regions 8025 and 8026) and mounting portions (e.g., the mounting portions 8105 and 8106 of FIG. 8C) of both corner portions located at a lower end of a housing will be described below with reference to FIG. 14.

The housing (e.g., front case) (e.g., the housing 810 of FIG. 8C) may be mounted to a dispensing device such that a front face is visible (operation 1401).

A first adhesive material (e.g., the first adhesive material 820 of FIG. 9) may be applied to a mounting portion (e.g., the mounting portions 8101 to 8106 of FIG. 8C) by using the prepared dispensing device (operation 1402).

After the first adhesive material is applied, a second adhesive material (e.g., the second adhesive material 822 of FIG. 12A) may be applied to a prepared opening (e.g., the opening 823 of FIG. 9) (operation 1403).

The housing may be detached from the dispensing device after the second adhesive material (e.g., the second adhesive material 822 of FIG. 12A) is applied (operation 1404).

A front plate (e.g., the front plate 802 of FIG. 8B) may be assembled in the housing to which the first and second adhesive materials are applied (operation 1405).

After the aforementioned series of operations are performed, the first and second adhesive materials (e.g., the first adhesive material 820 of FIG. 9) may be cured to constitute an adhesive layer, and the second adhesive material (e.g., the second adhesive material 822 of FIG. 12A) may be sealed by a combination of the first adhesive material and the front plate, thereby maintaining an uncured state.

Figure 15:
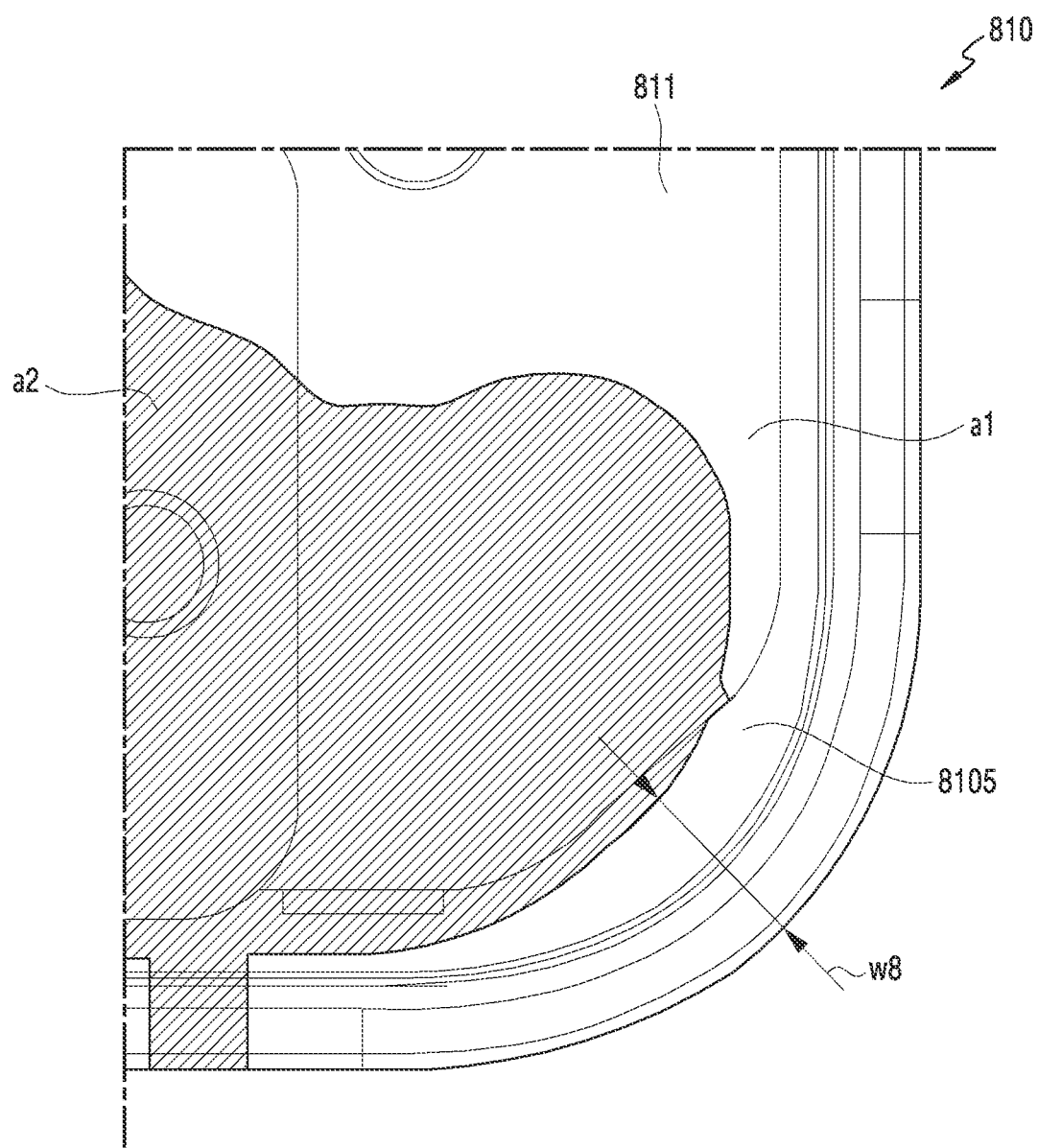
FIG. 15 is a partially enlarged view illustrating a hydrophilic material region and hydrophobic material region of an intermediate plate of a housing according to an embodiment of the disclosure.

FIG. 15 is a partially enlarged view illustrating a hydrophilic material region and hydrophobic material region of an intermediate plate of a housing according to various embodiments of the disclosure.

Referring to FIG. 15, when a hydrophilic adhesive material is applied to a mounting portion 8105, bonding strength may be secured by decreasing a bonding area of a corner portion of a hydrophobic material (e.g., a non-metallic material) a2 and by expanding a bonding area of a corner portion of a hydrophilic material (e.g., a metallic material) a1. A width w8 of a mounting portion of a corner portion may be constructed to be greater than a width of a mounting portion of a non-corner portion.

According to an embodiment, a housing 810 may include an intermediate plate 811, and a mounting portion of the intermediate plate 811 may include a hydrophobic or hydrophilic material. Since the intermediate plate 811 including the mounting portion contains a metallic material in the mounting portion 8105 of a corner portion to which an adhesive material is to be applied with a relatively great amount, it may be advantageous to expand bonding strength of the adhesive material when constructed of the hydrophilic material a1. It may also be advantageous to expand the bonding strength when a region constructed of the hydrophilic material a1 is expanded.

According to an embodiment, the intermediate plate 811 has a first water affinity, and may include the hydrophilic material a1 or the hydrophobic material a2. For example, the hydrophobic material may include PolyButylene terephthalate (PBT), PolyAmide (PA), or the like. For example, the hydrophilic material may include Aluminum (Al), Magnesium (Mg), or the like.

The water affinity of the adhesive material applied to the mounting portion 8105 shall be identical or similar to the water affinity of the intermediate plate 811, so that the bonding strength between the adhesive material and the mounting portion is excellent.

A surface condition may be important in the mounting portion (including first and second surfaces of the front plate) which is a mounting region to which the adhesive material is applied. In general, surface energy may consist of anode energy and cathode energy. For example, the anode energy may represent hydrophilicity of the material, and the cathode energy may represent hydrophobicity of the material According to an embodiment, when a hydrophilic adhesive material having great anode energy and a material having similar great anode energy are combined, the two materials have similar properties and thus may be easily wet with each other. The two materials are constructed to have similar properties to each other, so that mutual bonding strength may be good.

When a hydrophilic adhesive agent (material) having great anode energy and a hydrophobic material having great cathode energy are combined, the two materials are combined only by a small amount of energy, so that mutual bonding strength may be not good.

According to an embodiment of the disclosure, an electronic device (e.g., the electronic device 100 of FIG. 1 or the electronic device 300 of FIG. 3) may include a housing (e.g., the housing 110 of FIG. 1 or the lateral bezel construction 310 of FIG. 3) including a front plate (e.g., the front plate 320 of FIG. 3) facing a first direction (e.g., the first direction ① of FIG. 4), a rear plate (e.g., the rear plate 380 of FIG. 3) facing a second direction (e.g., the second direction ② of FIG. 4) opposite to the first direction, and a lateral member (e.g., the lateral member 118 of FIG. 1) surrounding a space between the front plate and the rear plate and at least partially constructed of a metal material.

The front plate may include a first edge (e.g., the first edge 8021 of FIG. 8A) having a first length (e.g., the first length 11 of FIG. 8A) and extending in a third direction (e.g., the third direction ③ of FIG. 8A), a second edge (e.g., the second edge 8022 of FIG. 8A) having a second length (e.g., the second length 12 of FIG. 8A) longer than the first length and extending in a fourth direction (e.g., the fourth direction ④ of FIG. 8A) orthogonal to the third direction, a third edge (e.g., the third edge 8023 of FIG. 8A) parallel to the first edge, having the first length, and extending in the third direction from the second edge, a fourth edge (e.g., the fourth edge 8024 of FIG. 8A) parallel to the second edge, having the second length, and extending in the fourth direction from the first edge, a first region (e.g., the first region 8025 of FIG. 8A) in which the third edge and the fourth edge meet, and a second region (e.g., the second region 8026 of FIG. 8A) in which the second edge and the third edge meet.

The electronic device may include a display (e.g., the display 800 of FIG. 8B) viewable through the front plate, and an adhesive layer (e.g., the adhesive layer 820 of FIG. 9) constructed in a closed-curve shape along the first edge, second edge, third edge, and fourth edge of the front plate. When viewed from above the display, a width w2 of the adhesive layer in the first region and the second region may be greater than a width w1 of the adhesive layer.

According to an embodiment of the disclosure, the adhesive layer in the first region (e.g., the first region 8025 of FIG. 8A) and the second region (e.g., the second region 8026 of FIG. 8A) may include a first adhesive material (e.g., the first adhesive material 820 of FIG. 13A) and a second adhesive material (e.g., the second adhesive material 822 of FIG. 13A). When viewed from above the display, the first adhesive material may surround the second adhesive material.

According to an embodiment of the disclosure, the first adhesive material (e.g., the first adhesive material 820 of FIG. 13A) may include at least one of acrylate, silicone, urethane, thermoplastic, or epoxy.

According to an embodiment of the disclosure, the second adhesive material (e.g., the second adhesive material 822 of FIG. 13A) may include a wet-hardening bond.

According to an embodiment of the disclosure, the display (e.g., the display 800 of FIG. 8B) may include a first face facing the first direction (e.g., the first direction ① of FIG. 8B), and a second face facing the second direction (e.g., the second direction ② of FIG. 8B). When viewed from above the display, the display may further include a flexible printed circuit board (e.g., the flexible printed circuit board 814 oaf FIG. 8B), which is bent towards the second face, in a third region (e.g., the third region 8027 of FIG. 8B) between the first region and the second region.

According to an embodiment of the disclosure, an electronic device (e.g., the electronic device 100 of FIG. 1 or the electronic device 300 of FIG. 3) may include a housing (e.g., the housing 110 of FIG. 1 or the lateral bezel construction 310 of FIG. 3) including a front plate (e.g., the front plate 320 of FIG. 3 or the front plate 802 of FIG. 8A) facing a first direction (e.g., the first direction ① of FIG. 4), a rear plate (e.g., the front plate 320 of FIG. 3) facing a second direction (e.g., the second direction ② of FIG. 4) opposite to the first direction, and a lateral member (e.g., the lateral member 118 of FIG. 1) surrounding a space between the front plate and the rear plate and at least partially constructed of a metal material.

The front plate may include a first edge (e.g., the first edge 8021 of FIG. 8A) having a first length (e.g., the first length 11 of FIG. 8A) and extending in a third direction (e.g., the third direction ③ of FIG. 8A), a second edge (e.g., the second edge 8022 of FIG. 8A) having a second length (e.g., the second length 12 of FIG. 8A) longer than the first length and extending in a fourth direction (e.g., the fourth direction ④ of FIG. 8A) orthogonal to the third direction, a third edge (e.g., the third edge 8023 of FIG. 8A) parallel to the first edge, having the first length, and extending in the third direction from the second edge, a fourth edge (e.g., the fourth edge 8024 of FIG. 8A) parallel to the second edge, having the second length, and extending in the fourth direction from the first edge, a first region (e.g., the first region 8025 of FIG. 8A) in which the third edge and the fourth edge meet, and a second region (e.g., the second region 8026 of FIG. 8A) in which the second edge and the third edge meet.

The electronic device may include a display viewable through the front plate, and an adhesive layer (e.g., the adhesive layer 540 of FIG. 5) constructed in a closed-curve shape along the first edge, second edge, third edge, and fourth edge of the front plate. An intermediate plate (e.g., the intermediate plate 811 of FIG. 10) included in the first region (e.g., the first region 8025 of FIG. 8A) and the second region (e.g., the second region 8026 of FIG. 8A) may include a material having a first water affinity. The adhesive layer may include a material having a second water affinity identical to similar to the first water affinity.

According to an embodiment of the disclosure, the first water affinity may be hydrophobicity.

According to an embodiment of the disclosure, the first water affinity may be hydrophilicity.

According to an embodiment of the disclosure, an electronic device (e.g., the electronic device 100 of FIG. 1 or the electronic device 300 of FIG. 3) may include a housing (e.g., the housing 110 of FIG. 1 or the lateral bezel construction 310 of FIG. 3) including a front plate (e.g., the front plate 320 of FIG. 3 or the front plate 802 of FIG. 8A) facing a first direction (e.g., the first direction ① of FIG. 4), a rear plate (e.g., the rear plate 380 of FIG. 3) facing a second direction (e.g., the second direction ②) of FIG. 4) opposite to the first direction, and a lateral member (e.g., the lateral member 118 of FIG. 1) surrounding a space between the front plate and the rear plate and at least partially constructed of a metal material, and including a mounting portion constructed along an edge. The electronic device may include a display (e.g., the display 800 of FIG. 8B) including a display module (e.g., the display panel 801 of FIG. 8B) coupled to the front plate, and mounted to the front plate so that at least part thereof is viewable through the front plate, and a bonding structure attached between the mounting portion and the front plate to seal an inner portion of the housing. The bonding structure may include a first adhesive material applied along the mounting portion (e.g., the mounting portion 630 oaf FIG. 6B). When viewed from above the front plate, the first adhesive material may be applied such that a width w2 of the material applied to a mounting portion in a corner region of the housing is variable, compared to a width w1 of the material applied to a mounting portion in at least one non-corner region of the housing.

According to an embodiment of the disclosure, the first adhesive material (e.g., the first adhesive material 820 of FIG. 10) may be applied to each of first and second mounting portions (e.g., the first and second mounting portions 8105 and 8106 of FIG. 8C) in both corner portions of the housing adjacent to a flexible printed circuit board (e.g., the flexible printed circuit board 814 of FIG. 8B) of the display.

According to an embodiment of the disclosure, the first adhesive material (e.g., the first adhesive material 820 of FIG. 9) may be allocated to each of the first and second mounting portions (e.g., the first and second mounting portions 8105 and 8106) in two lines, and when viewed from above the front plate, may include at least one closed-curve shape having an inner space.

According to an embodiment of the disclosure, a second adhesive material (e.g., the second adhesive material 822 of FIG. 13A) may be filled in the inner space.

According to an embodiment of the disclosure, the second adhesive material (e.g., the second adhesive material 822 of FIG. 13A) may include a wet-hardening bond.

According to an embodiment of the disclosure, a width w2 of the first adhesive material (e.g., the first adhesive material 820 of FIG. 9) applied to each of the first and second mounting portions (e.g., the first and second mounting portions 8105 and 8106 of FIG. 8C) may be greater than a width w1 of the first adhesive material applied to the mounting portion in the non-corner region of the housing.

According to an embodiment of the disclosure, when viewed from above the front plate (e.g., the front plate 320 of FIG. 3), the first and second mounting portions (e.g., the first and second mounting portions 8105 and 8106 of FIG. 8C) may be covered by an inactive region of the display.

According to an embodiment of the disclosure, an intermediate plate (e.g., the intermediate plate 811 of FIG. 9) included in the first mounting portion and the second mounting portion may include a first water affinity. The first adhesive material (e.g., the first adhesive material 820 of FIG. 9) may include a material having a second water affinity identical to similar to the first water affinity.

According to an embodiment of the disclosure, the first water affinity may be hydrophobicity.

According to an embodiment of the disclosure, the first water affinity may be hydrophilicity.

According to an embodiment of the disclosure, the second adhesive material (e.g., the second adhesive material 822 of FIG. 12A) may provide a self-restoration structure of the bonding structure.

According to an embodiment of the disclosure, the self-restoration structure may be constructed in such a manner that, when the first adhesive material (e.g., the first adhesive material 820 oaf FIG. 9) is cracked or peeled, the second adhesive material is cured by flowing out through the crack.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing comprising:
a front plate outwardly facing a first direction,
a rear plate outwardly facing a second direction opposite to the first direction, and
a lateral member surrounding a space between the front plate and the rear plate and at least partially constructed of a metal material,
wherein the front plate comprises:
a first edge having a first length and extending in a third direction,
a second edge having a second length longer than the first length and extending in a fourth direction orthogonal to the third direction,
a third edge parallel to the first edge, having the first length, and extending in the third direction from the second edge,
a fourth edge parallel to the second edge, having the second length, and extending in the fourth direction from the first edge,
a first region in which the third edge and the fourth edge meet, and
a second region in which the second edge and the third edge meet;
a display viewable through the front plate; and
an adhesive layer constructed in a curved shape along the first edge and second edge of the front plate,
wherein, when viewed from above the display, a width of the adhesive layer in the first region is greater than a width of the adhesive layer outside the first region.

2. The electronic device of claim 1, wherein the adhesive layer is additionally constructed along the third edge and the fourth edge of the front plate.

3. The electronic device of claim 2, wherein the adhesive layer comprises a closed curved shape.

4. The electronic device of claim 2, wherein a width of the adhesive layer in the second region is greater than a width of the adhesive layer outside the second region.

5. The electronic device of claim 4, wherein the adhesive layer in the first region and the second region comprises a first adhesive material and a second adhesive material, and when viewed from above the display, the first adhesive material surrounds the second adhesive material.

6. The electronic device of claim 5, wherein the second adhesive material is filled in an inner space of the first adhesive material.

7. The electronic device of claim 1, wherein a thickness of the adhesive layer in the first region is greater than a thickness of the adhesive layer outside the first region.

8. The electronic device of claim 7, wherein a thickness of the adhesive layer in the second region is greater than a thickness of the adhesive layer outside the second region.

9. The electronic device of claim 1, wherein an area of the adhesive layer in the first region is greater than an area of the adhesive layer outside the first region.

10. The electronic device of claim 9, wherein an area of the adhesive layer in the second region is greater than an area of the adhesive layer outside the second region.

11. An electronic device comprising:
a housing comprising:
a front plate outwardly facing a first direction,
a rear plate outwardly facing a second direction opposite to the first direction, and
a lateral member surrounding a space between the front plate and the rear plate and at least partially constructed of a metal material,
wherein the rear plate comprises:
a first edge having a first length and extending in a third direction,
a second edge having a second length longer than the first length and extending in a fourth direction orthogonal to the third direction,
a third edge parallel to the first edge, having the first length, and extending in the third direction from the second edge,
a fourth edge parallel to the second edge, having the second length, and extending in the fourth direction from the first edge,
a first region in which the third edge and the fourth edge meet, and
a second region in which the second edge and the third edge meet;
a display viewable through the front plate; and
an adhesive layer constructed in a curved shape along the first edge and second edge of the front plate,
wherein, when viewed from above the display, a width of the adhesive layer in the first region is greater than a width of the adhesive layer outside the first region.

12. The electronic device of claim 11, wherein the adhesive layer is constructed along the third edge and the fourth edge of the front plate.

13. The electronic device of claim 12, wherein the adhesive layer comprises a closed curved shape.

14. The electronic device of claim 12, wherein the width of the adhesive layer in the second region is greater than a width of the adhesive layer outside the second region.

15. The electronic device of claim 14, wherein the adhesive layer in the first region and the second region comprises a first adhesive material and a second adhesive material, and when viewed from above the display, the first adhesive material surrounds the second adhesive material.

16. The electronic device of claim 15, wherein the second adhesive material is filled in an inner space of the first adhesive material.

17. The electronic device of claim 11, wherein a thickness of the adhesive layer in the first region is greater than a thickness of the adhesive layer outside the first region.

18. The electronic device of claim 17, wherein a thickness of the adhesive layer in the second region is greater than a thickness of the adhesive layer outside the second region.

19. The electronic device of claim 11, wherein an area of the adhesive layer in the first region is greater than an area of the adhesive layer outside the first region.

20. The electronic device of claim 19, wherein an area of the adhesive layer in the second region is greater than an area of the adhesive layer outside the second region.

* * * * *